United States Patent
Leeds et al.

(10) Patent No.: US 8,068,604 B2
(45) Date of Patent: Nov. 29, 2011

(54) METHOD AND SYSTEM FOR EVENT NOTIFICATIONS

(75) Inventors: Richard Leeds, Bellevue, WA (US); Elon Gasper, Bellevue, WA (US)

(73) Assignee: Computer Product Introductions Corporation, Bellevue, WA (US)

( * ) Notice: Subject to any disclaimer, the term of this patent is extended or adjusted under 35 U.S.C. 154(b) by 257 days.

(21) Appl. No.: 12/339,429

(22) Filed: Dec. 19, 2008

(65) Prior Publication Data

US 2010/0161683 A1    Jun. 24, 2010

(51) Int. Cl.
H04M 3/00 (2006.01)
(52) U.S. Cl. ............... 379/373.04; 379/76; 379/167.08; 455/567
(58) Field of Classification Search ............. 379/142.04, 379/374.02, 67.1, 68, 71, 72, 76, 164, 167.08, 379/179, 180, 252, 263, 373.01–373.04, 379/374.03, 375.01; 455/567
See application file for complete search history.

(56) References Cited

U.S. PATENT DOCUMENTS

| | | | |
|---|---|---|---|
| 6,400,808 B1 | 6/2002 | Burg | |
| 7,127,238 B2 | 10/2006 | Vandermeijden et al. | |
| 7,310,416 B1 * | 12/2007 | Henderson | 379/142.04 |
| 2003/0026416 A1 | 2/2003 | Fusco | |
| 2004/0067751 A1 | 4/2004 | Vandermeijden et al. | |
| 2004/0120505 A1 | 6/2004 | Kotzin et al. | |
| 2004/0235520 A1 | 11/2004 | Cadiz et al. | |
| 2006/0003814 A1 | 1/2006 | Moody et al. | |
| 2006/0111085 A1 | 5/2006 | Lee | |
| 2006/0148459 A1 | 7/2006 | Wolfman et al. | |
| 2006/0199575 A1 | 9/2006 | Moore et al. | |
| 2006/0215827 A1 | 9/2006 | Pleging et al. | |
| 2007/0064921 A1 | 3/2007 | Albukerk et al. | |
| 2007/0117554 A1 | 5/2007 | Armos | |
| 2007/0264978 A1 | 11/2007 | Stoops | |

FOREIGN PATENT DOCUMENTS

| | | |
|---|---|---|
| EP | 0 802 661 A2 | 10/1997 |
| EP | 1 098 503 A2 | 5/2001 |
| EP | 1 814 296 A1 | 8/2007 |

* cited by examiner

*Primary Examiner* — Md S Elahee
(74) *Attorney, Agent, or Firm* — LaRiviere, Grubman & Payne, LLP

(57) ABSTRACT

A method for generating a ring tone for a given caller based on a prior conversation with that caller. A portion of a conversation with a given caller is recorded and stored in memory as a ring tone. When a subsequent call is received from the same caller, identified by caller ID, the ring tone is played, alerting the user to the incoming call as well as the context of their prior communication. In alternative embodiments of the invention, a prior textual or video conversation is used as the basis for a ring tone, and/or the 'ring tone' is delivered by other than audio means. The invention is capable of implementation in telecommunications systems such as cellular, local exchange, and VOIP, and in combination with other forms of internet-based telecommunication.

19 Claims, 15 Drawing Sheets

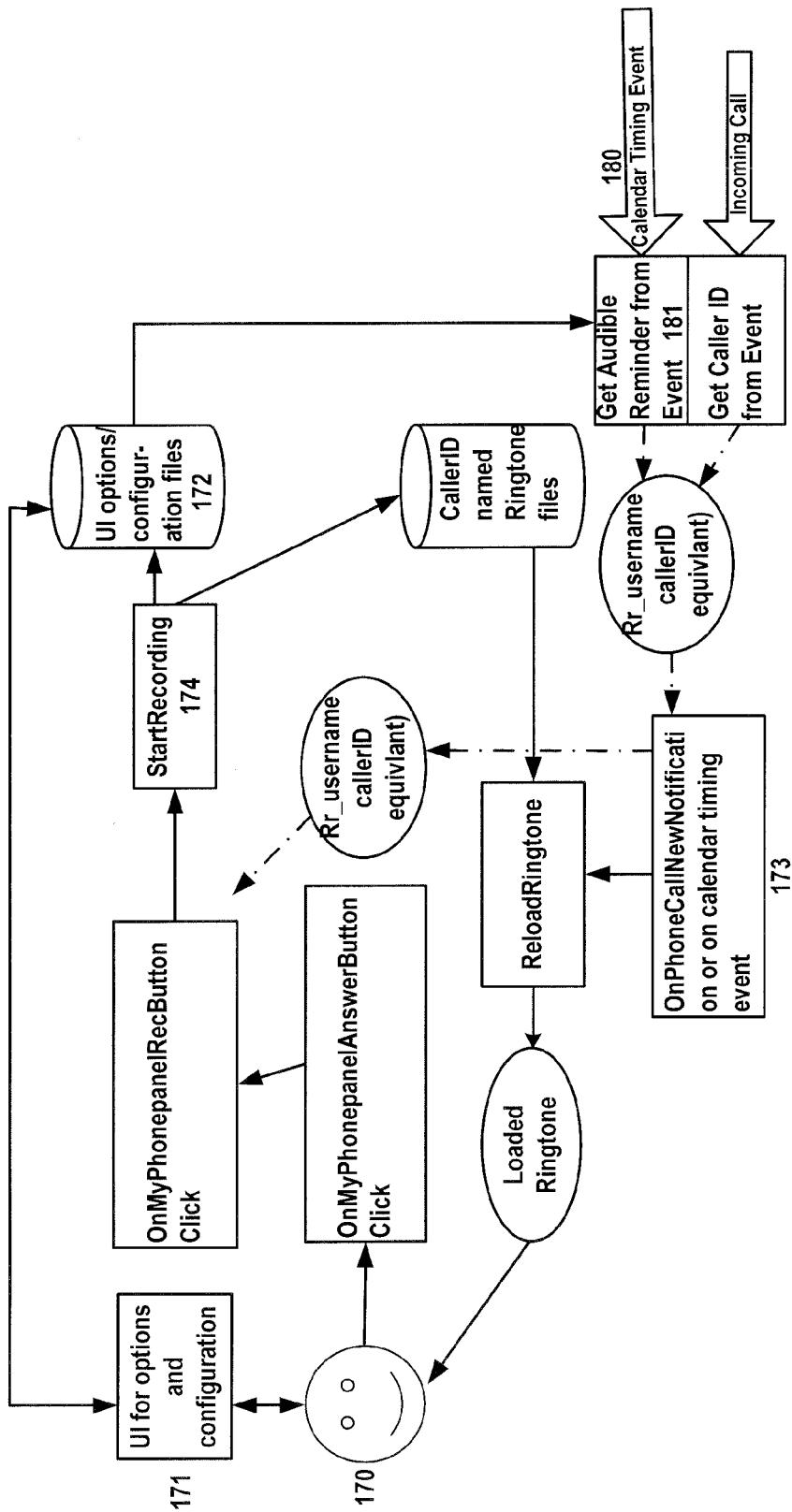
Figure 11 - Reminder Ring plus calander/appointments reminders

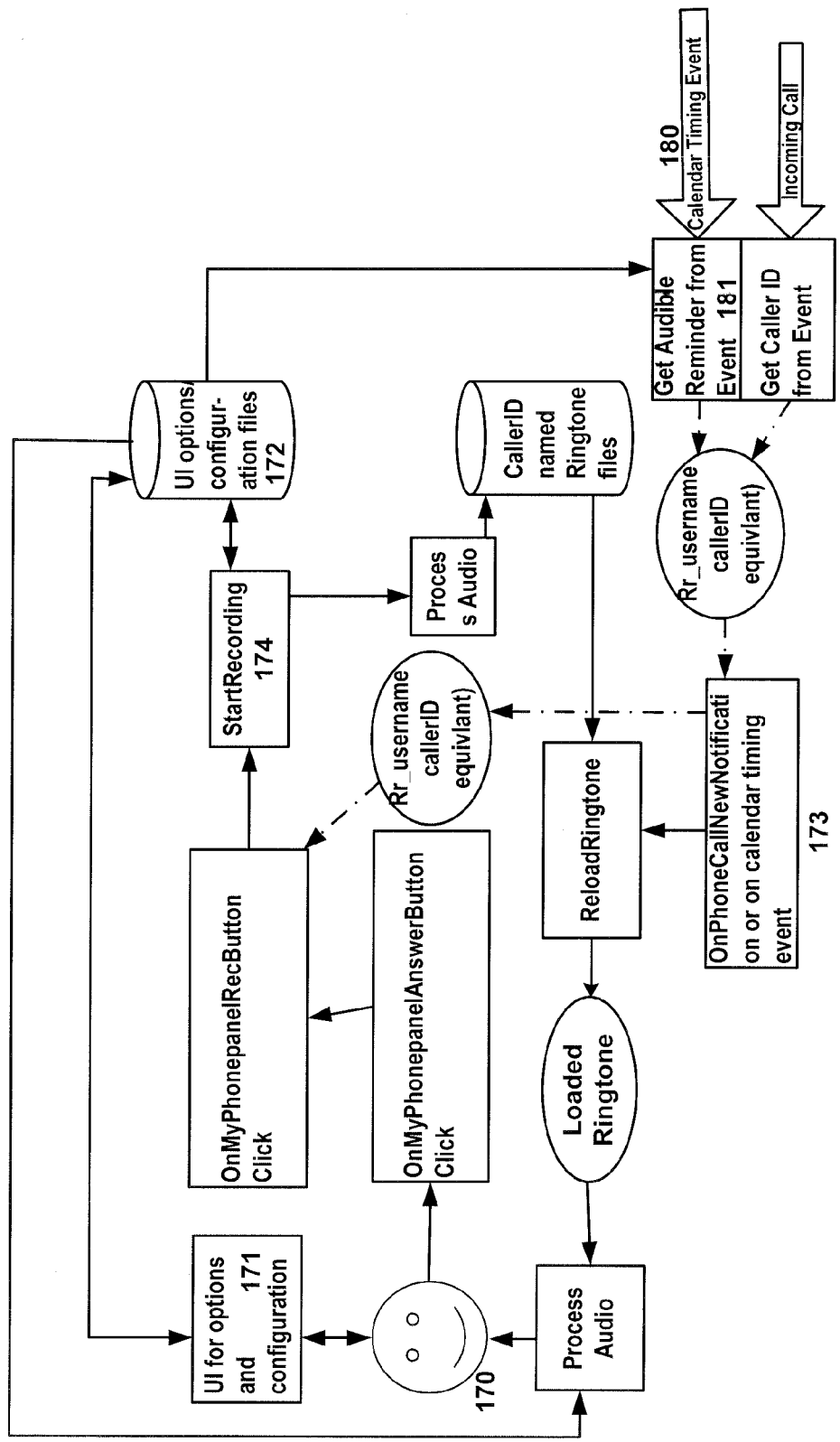
Figure 12 - Basic system plus calendaring with sound processing shown explicitly

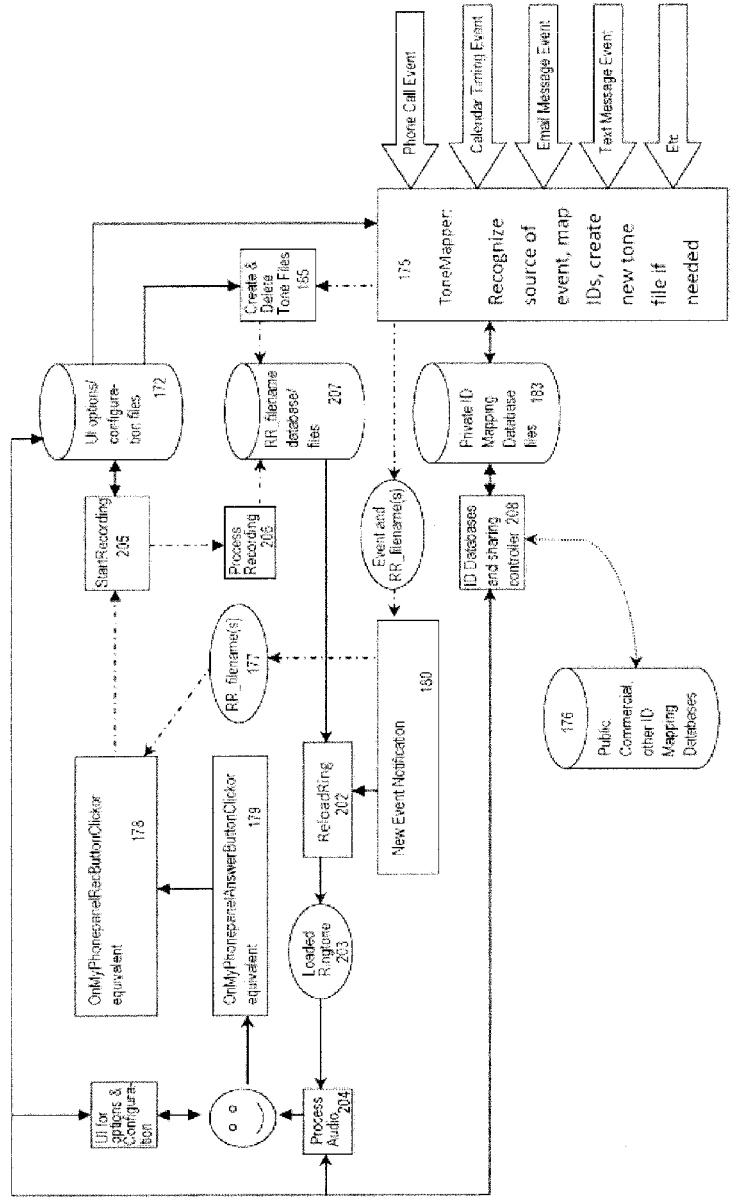
fig 13 - extended system overview showing main data flows.
Dashed line ----▶ shows main RR_filename route (other data also progresses on it, too).
Dotted line ·······▶ shows storage and/or other components presumably often at least somewhat external to system, for example maybe over the internet or on a purchased commercial CD-Rom.

Example individual database record structure for the Private ID Mapping Database shown in figure 13

| Explanation | Label | additional fields that are part of it |
|---|---|---|
| RR Key ID record based fields: | | |
| Unique identifier (number or text string) for person (or equivalent abstraction; see text) | RR Key ID | |
| Name of person | Name | A number of standard fields for person's name, nicknames, etc. |
| Address | Address | A number of standard address fields |
| Other | Other | Other optional common contact info, notes, digitized cards, etc. |
| Current general rr_filename Ringtone to use for him/her (like rr_username ID; might be a rr_filename key to a database, not an actual filename) | rr_filename | latest one and optionally, an alternate backup one, or even more; date each was stored, whether it overrides individual ones (for ret/toymaster) |
| Phone info for standard reminderRings; possibly different from different phones; with dates for possible rotations | Phone | Phone numbers (caller IDs) each with optional rr_filename(s) and date(s) assigned |
| Calendar reminders and info needed to work with external calendar program(s) | Calendar | reminder times, each with optional rr_filename(s) and date(s) assigned, possibly also with data needed to interact with separate personal information manager / calendar / appointment program |
| For announciations of email, possibly through speech synthesis, as reminderRings based on other (preferably prior) communication with that person. | email | Email addresses, each with optional rr_filename(s) and dates assigned |
| | | Also with flags that indicate possible construction of rr_filename(s) |
| | | Additional data to validate headers or otherwise guard against spoofing (most likely needed for this medium because email is so easy to spoof; could be present for others, too) |
| For text message systems | Text | Alias names and/or IP addresses that serve as message identifiers |
| | | Also with flags that indicate possible construction of rr_filename(s) |
| For all other types of telecomm the user engages in | Other telecomm | Also with flags and data, such as prior text messaging from this person, that indicate possible construction of rr_filename(s) |
| | | indicators of originator in that medium, each with optional rr_filenames and date assigned |
| Other fields: | | |
| Disambiguation data, to resolve cases of multiple persons at one callerID, for example | Disambiguation guidance | globally, at record level, or individually for each possible one |
| Sharing - as individual record notes and/or special records outside the main RR key ID list | Sharing | Designations of shared information, such as imported, private or referenceable by a group, with necessary access data such as security codes |
| Parameters to govern picking up a new reminder ring - such as duration, volume, user keying, speech recognition of key words (such as for automated appointment making, etc.) | Hurdles | Designations and data needed for parameterized creation of new reminder rings. May be global, at record level, or even individually |
| A list of mappings of locally used rr_filenames to those utilized from outside the private db, to deal with collisions, may be stored here (or could be in Sharing). For the sake of robustness, diagnostics, and efficiency in the performance-critical phase of rr_filename assignments, a complete list of rr_filenames may be included as well. | RR_filenames map | List of RR_filenames in use and possibly some correspondent ones |

Figure 14

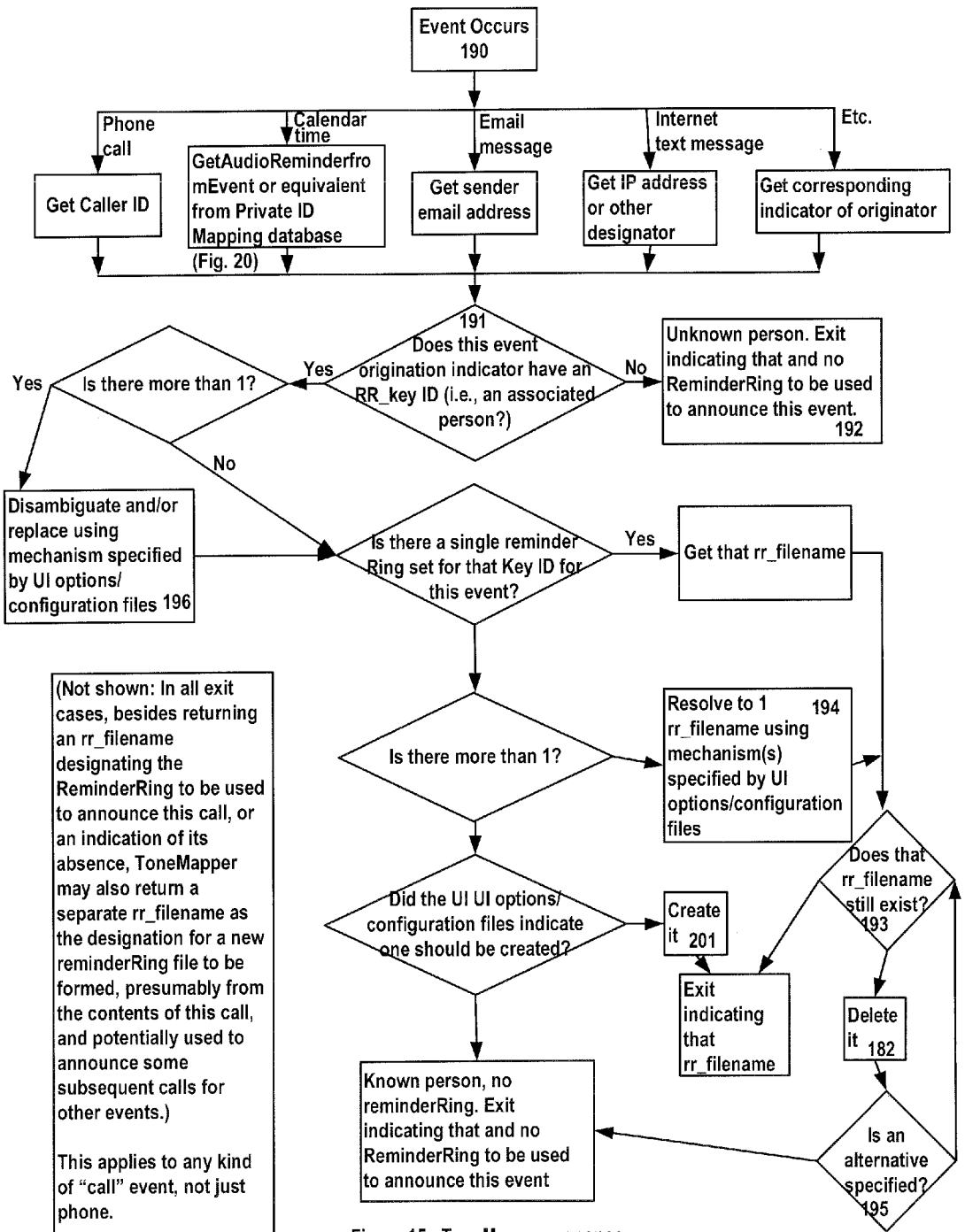
Figure 15 - ToneMapper response to telecommunications event

METHOD AND SYSTEM FOR EVENT NOTIFICATIONS

CROSS-REFERENCE TO RELATED DOCUMENTS

This non-provisional application is based on and claims priority to U.S. patent application Ser. No. 12/039,596, filed on Feb. 28, 2008.

TECHNICAL FIELD

The present invention relates to the field of telecommunications. More specifically, the present invention relates to a system and method for integrating one or more modes of communication systems with an advances event communication notification system.

COMPUTER PROGRAM LISTING APPENDIX ON COMPACT DISC

A computer program listing appendix on compact disc is included as part of this application and the contents of the compact discs are incorporated herein by reference in their entirety for all purposes. The computer program listing appendix includes two compact discs (including duplicates) that are identical copies of each other. Each compact disc contains the following files: gnash.txt, 7,599,680 bytes, created Dec. 19, 2008; SDL_source.txt, 24,217 bytes, created Dec. 19, 2008; sound_play.txt, 3,113 bytes created Dec. 17, 2008; wxCommunicator.txt, 31,594,545 bytes, created Dec. 19, 2008; modified_wxCommunicator.txt, 7,605 bytes, created Dec. 19, 2008; and Rainlendar_for_RR_patent_disclosure.txt, 6,188,198 bytes created Dec. 19, 2008.

BACKGROUND ART

Human interaction is mediated by the effects of perceiving the presence of other human. Their verbal and nonverbal cues are of the essence to our nature and function as social animals. Recent psychological experiments and brain MRI results confirm what motivational experts and organizational adepts have always known: that people function both proactively and reactively, the latter particularly to stimuli from other folks they are in communication with. Successful business models involve an acknowledgement of this fact, from ADHD coaches to podcasting housework mavens like FlyLady, from squawk-box-driven brokerage boiler rooms to talking-head TV programming.

But as the social web around us has expanded with the aid of electronic communications, the technological limitations of its early implementation have stifled the development of the end user. Though some relatively feeble attempts to add a bit of face to the interface, such as with programs like Facebook, have succeeded quickly and been imitated by others, most have focused on growing a network faster rather than representing and relating it to each user in a better way. This has further led to a fractured social graph with multiple modes of not just communication, but representation also, with competing networks, identity management and user interfaces. And again, most attempts at improvement have been focused toward the center, not the nodes.

Take for example, the simple ring tone. A ring tone is an audio segment played to alert the user of a telecommunications device to an incoming phone call or other type of communication. Ring tones are typically stored as digital audio files on a telecommunications device such as a cellular phone. Customizable ring tones have gained in popularity, as they allow users to set a specific ring tone to be played when receiving a call from a specific person recognized by their caller ID. Many carriers offer services whereby users may download specialized ring tones such as songs or other sound effects directly to a device. In the alternative, digital audio files may be uploaded to a telecommunications device and used as a ring tone. Utilities exist which enable users to create their own ring tones based on pre-recorded sounds, allowing mixing of multiple sounds and other forms of audio manipulation.

However, though a diversity of customization options exists for the creation of ring tones, these technologies only facilitate the singular function of identifying the calling party to the user. Existing ring tone technologies do not provide the user with any additional information relating to the caller or the probable context of their call. Therefore, additional utility would be derived if a ring tone not only aided in identification of the caller, but also provided information as to the probable intent of the caller. The present invention solves this problem through the creation of a ring tone which incorporates the content of previous correspondence with the caller.

Hardly any attempt to help a user associate a call request with his counterparty have penetrated the market, and none have utilized the voice from a prior conversation, which is a natural and effective remainder.

What is needed in the art is a means for remedying this lack of a humanized, individualized connectivity environment by gathering the separate threads of electronically-mediated connectivity not in their collective cloud, but rather at the individual. By furnishing the user with technology to integrate multimodal streams of communication from other people, and from himself, with representations that are more naturally suited for his sensory and cognitive nature, we furnish a better system to deal with telecommunication.

DISCLOSURE OF THE INVENTION

The present invention, referred to henceforward as ReminderRing, is a system and method for generating a ring tone or equivalent non-audio annunciation based on a prior audio, video, or textual conversation stream. The invention is applicable to communications systems and associated devices, including cellular, local exchange, voice-over-IP, general purpose computers, messaging systems, gaining devices, set-top devices, etc.

In one embodiment of the invention, a ring tone is generated from a recorded portion of a conversation with a caller. The ring tone is subsequently played when receiving a call from the same caller, who is identified by caller ID.

In another embodiment of the invention, a ring tone is generated by converting a text message, or portion thereof, to audio speech. The audio speech is then played when receiving a call from the same person, identified by caller ID.

Detailed methods are disclosed for implementation of the present invention in both a NetStream-type communications system and a SIP-style communications system.

In another embodiment of the invention, a calendaring system is implemented and integrated into the ReminderRing system.

This invention discloses a means for remedying this disparate situation by gathering the separate threads of electronically-mediated connectivity not in their collective cloud, but rather at the individual. By furnishing the user with technology to integrate his multimodal streams of telecommunication from other people, and himself, with representations that are more naturally suited for his sensory and cognitive nature, the current disclosure furnishes a better system to deal with telecommunication.

Part of this system is a breakthrough improvement in annunciation, an idea which has been archetypal to the implementation of telecommunication in the electronic world. For over a century phones have been ringing, alarms chiming, and speakers chanting 'you've got mail' at the world. Central to the present invention is the means to not only indicate symbolically, as ringtones already do, who is calling, emailing or otherwise partaking in a communication event and what it is about, but directly, by using that person's own voice, recorded from a previous call or other venue, as that 'ring'.

The current invention anchors a comprehensive system which is herein disclosed that improves telecommunication by adapting it better to human use at the level of individual connectivity.

Germane is the presentation of alarm and personal reminder and calendaring, and generally communication systems with the storage of portions of relevant conversation streams or communication data streams, or other audible or visual triggers, to enhance them in the fashion herein disclosed, and to obtain the efficiency of integration in a single system. The current embodiments disclose a means by which such personal information management can be effectively integrated with conversation monitoring.

BRIEF DESCRIPTION OF THE DRAWINGS

For a better understanding of the present invention, reference is made to the below-referenced accompanying drawings. Reference numbers refer to the same or equivalent parts of the present invention throughout the several figures of the drawings.

FIG. 11 is a block diagram showing the modified architecture of the wxCommunicator implementing Rainlendar in accordance with an embodiment of the present invention.

FIG. 12 is a block diagram showing the modified architecture of the wxCommunicator implementing Rainlendar in accordance with an embodiment of the present invention.

FIG. 13 is a block diagram showing the modified architecture of the wxCommunicator implementing Rainlendar and further configured to accommodate additional modes of communication.

FIG. 14 is an example table of a database record structure for the Private ID Mapping database utilized by embodiments of the current invention.

FIG. 15 is a flow diagram illustrating the function of the tone mapping component utilized by embodiments of the current invention.

MODES FOR CARRYING OUT THE INVENTION

The present invention is drawn to a system and method for creating a customized communication notification event system based on a previous communication which may supplement future communications.

Figure 1:
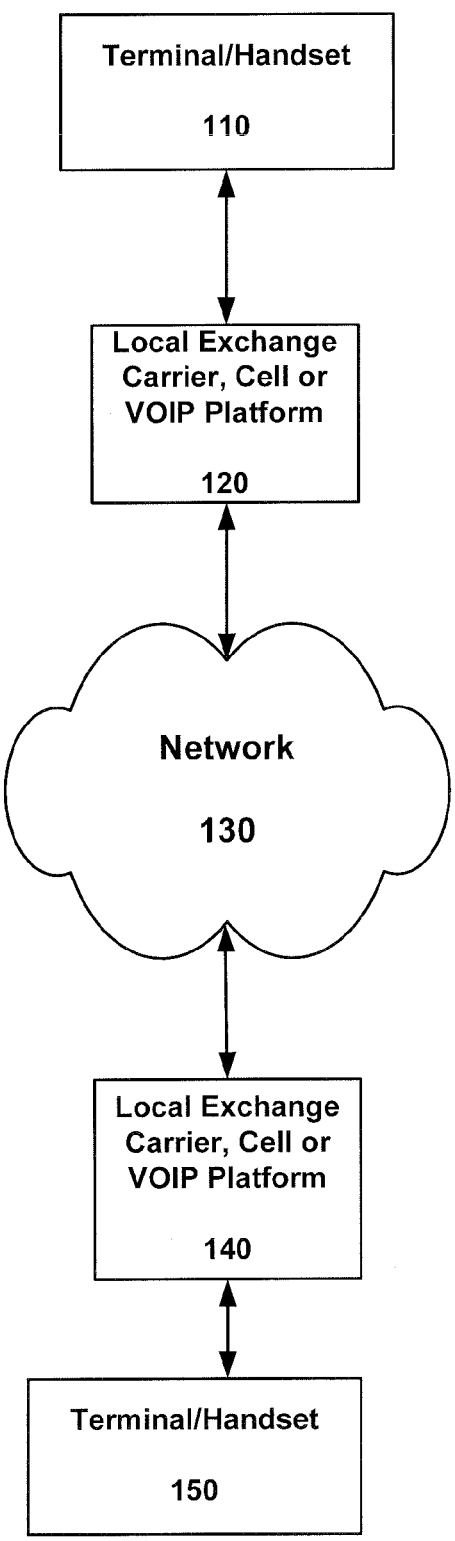
FIG. 1 is a block diagram showing the components of a standard telecommunications system.

With reference to FIG. 1, a diagram of a standard telecommunications system 100, in which an embodiment may be implemented, is shown. A first user (not shown) uses terminal/handset 110 to communicate with a second user (not shown) who uses terminal/handset 150. The terms "terminal" and "handset" as herein disclosed are used interchangeably and generically refer to telecommunications devices such as a cellular phone, pager, PDA, laptop, personal computer, etc. Terminals 110 and 150 transmit and receive data via platforms 120 and 140, respectively, which constitute communications platforms such as a private branch exchange (PBX), local exchange carrier (LEC), cellular platform, voice-over-IP (VOIP) platform, etc. Platforms 120 and 140 each connect to network 130, which may be any network, wired or wireless, ranging from a small private local network to the combined capability of the world's legacy hardwired systems (including the public switched telephone network (PSTN)) and the Internet.

Figure 2:
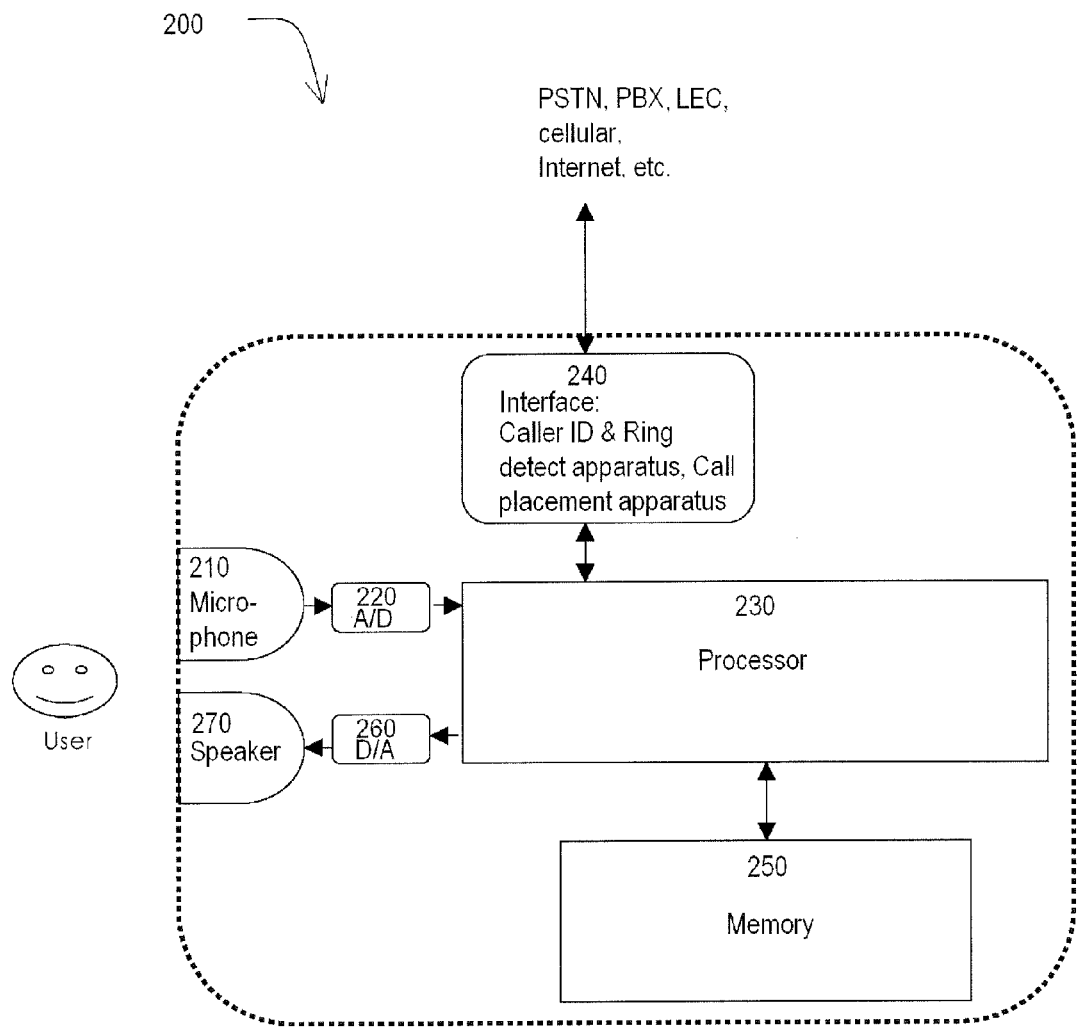
FIG. 2 is a schematic diagram showing the components of a terminal/handset.

With reference to FIG. 2, an exemplary schematic of a terminal/handset 200, in which the present invention may be implemented, is shown. Microphone 210 receives audio input from a user, which is converted to digital format by analog-to-digital converter 220. Similarly, a user listens to audio at speaker 270, the audio signal being produced from digital format by way of digital-to-analog converter 260. Processor 230 performs operations and processing, and is coupled to converters 220 and 260, memory 250, and interface 240. Interface 240 connects to external communications platforms or networks, such as PBX, LEC, PSTN, cellular, or the Internet. Interface 240 also contains electronic circuitry for caller ID, ring detection, and call placement. Memory 250 is coupled to processor 230, and provides storage capacity for data structures and files such as a contacts database, audio files, user settings, applications, data files, etc.

Figure 3:
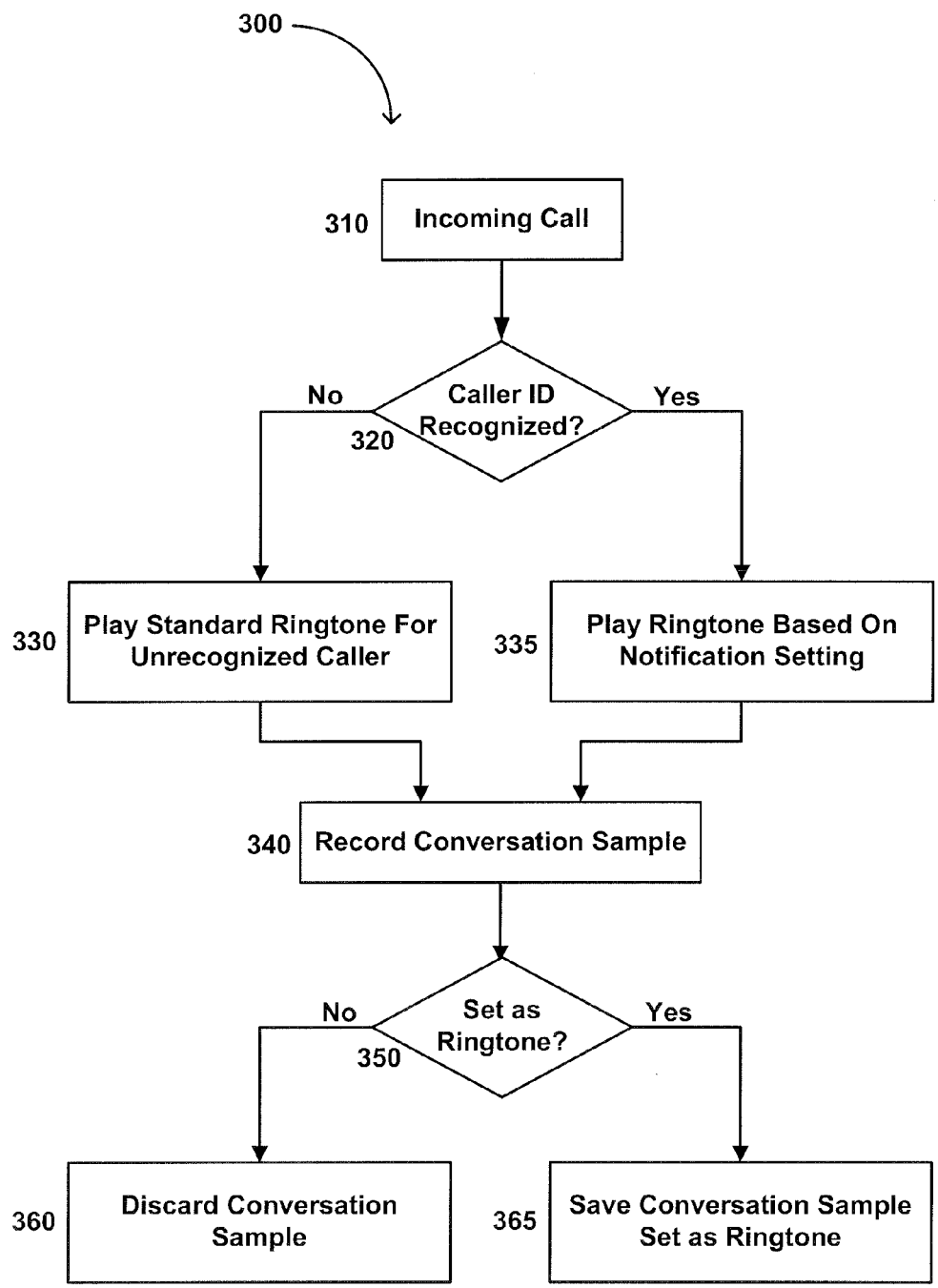
FIG. 3 is a flow diagram illustrating a method of creating and using a conversation-based ringtone.

With reference to FIG. 3, a flow diagram is shown illustrating a method 300 for creating and using a conversation-based ringtone in a terminal/handset in accordance with an embodiment of the present invention. At step 310, a user receives an incoming call from a caller, including caller ID information such as a telephone number. At step 320, it is determined whether the caller ID information of the caller is recognized or not. This is accomplished by checking against a contacts database, in which caller information such as name and phone number is stored. Associated with each contact in the contacts database is a notification setting indicating what ringtone to play when receiving a call from the contact. If the caller ID is not recognized in the contacts database, then at step 330, the standard ringtone for an unrecognized caller is played. On the other hand, if the caller ID is recognized in the contacts database, then at step 335, a ringtone is played based upon the ringtone setting associated with the contact. This may be a standard ringtone or some form of customized ringtone, such as a conversation-based ringtone, as is herein described. Assuming that the user answers the call, then a conversation stream will ensue.

At step 340, a sample from this conversation stream is recorded. The recording of the sample may be initiated frilly automatically, or automatically as determined by a user-selected setting, or triggered manually in response to a user command. The particular sample recorded may vary in scope and duration, in accordance with various embodiments of the present invention. By way of example, various options for the recorded sample might include the following: the first or last moments of the conversation, a randomly selected portion of the conversation, a concatenated and/or merged stream consisting of portions of the conversation recorded from one or more of the parties at different times during the conversation (e.g. 5 seconds of the conversation every 30 seconds), a portion of the conversation that varies depending upon the time of day, or a portion determined to be the most relevant portion by other analysis. The conversation sample is preferably recorded in a digital audio format, such as MP3, WMA, or AAC, and stored as a file and/or in a call conversation database.

At step 350, after the conclusion of the conversation, the user has the option to save and/or set the recorded conversation sample as the ringtone for that caller. If the user decides not to save the recorded sample, then at step 360, the sample is discarded. Whereas, if the user decides to set it as the ringtone, then at step 365, the notification option of the caller is set to play the recorded sample as a ringtone when a subsequent call is received from the same caller ID. In additional embodiments of the present invention, the recorded sample may be further processed—such as by applying sound effects, or by combining it with other sounds or music—either before or concurrently as it is used as a ringtone.

Figure 4:
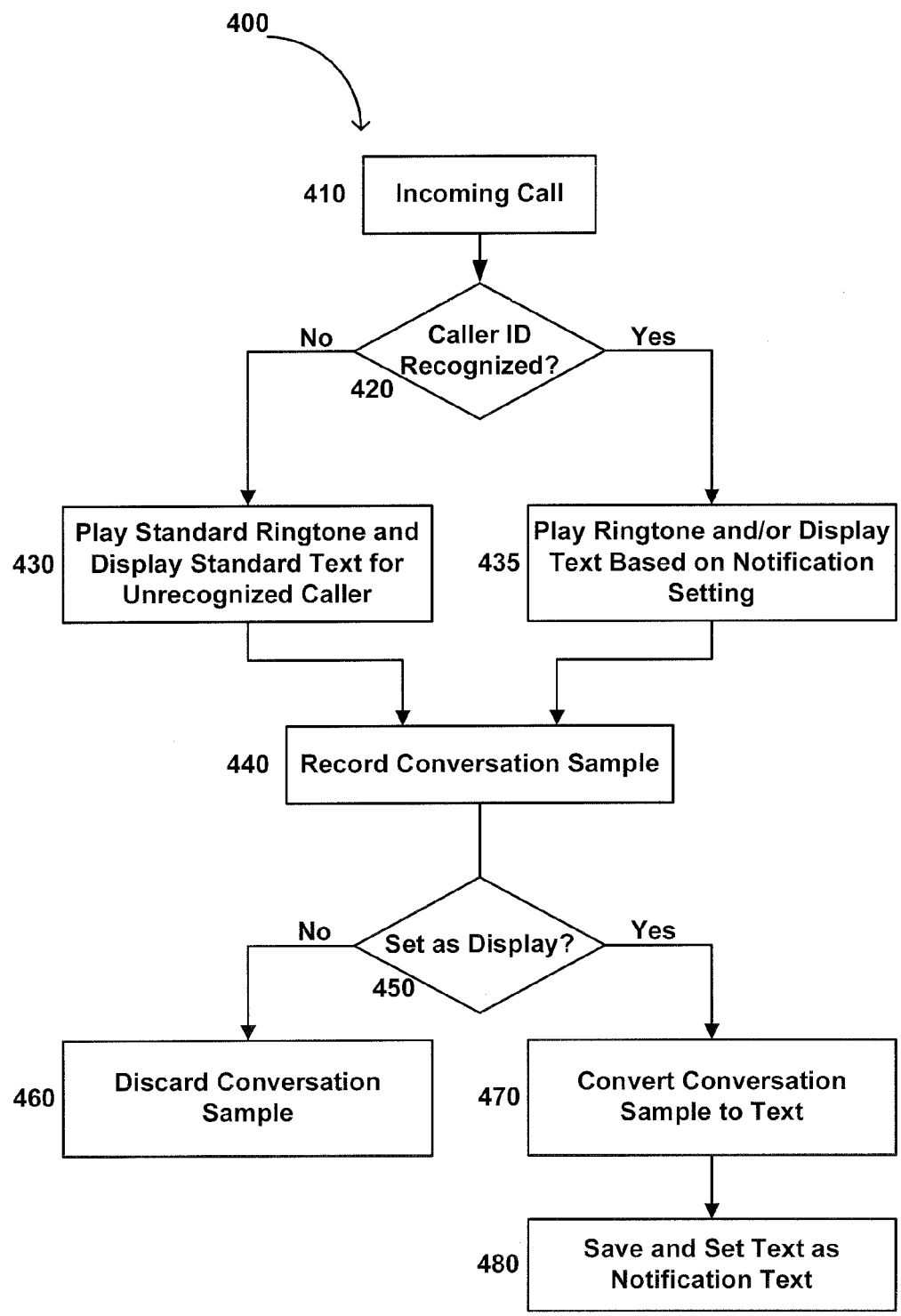
FIG. 4 is a flow diagram illustrating a method of creating and using a conversation-based textual display notification.

With reference to FIG. 4, a flow diagram is shown illustrating a method 400 of creating and using a conversation-based textual display notification, in accordance with an alternative embodiment of the present invention. At step 410, the user receives an incoming call from a caller, including caller ID information. At step 420, it is determined whether the caller ID information is recognized, by reference to a contacts database. If the caller ID is not recognized, then at step 430, a standard ringtone and standard text is displayed for the unrecognized caller. If the caller ID is recognized, then at step 435, a ringtone is played and text is displayed based upon the notification setting associated with the contact. At step 440, a sample of the conversation stream is recorded. At step 450, the user has the option to set the recorded conversation sample as text to be displayed when a subsequent call from the same caller is received. If the user decides not to do so, then at step 460, the conversation sample is discarded. If the user decides yes, then at step 470, the conversation sample is converted to text by a speech-to-text method as is known in the art. At step 480, this text is saved as a file or in a database, and the notification setting for the contact is set so that the text will be displayed when a subsequent call is received from the caller.

Figure 5:
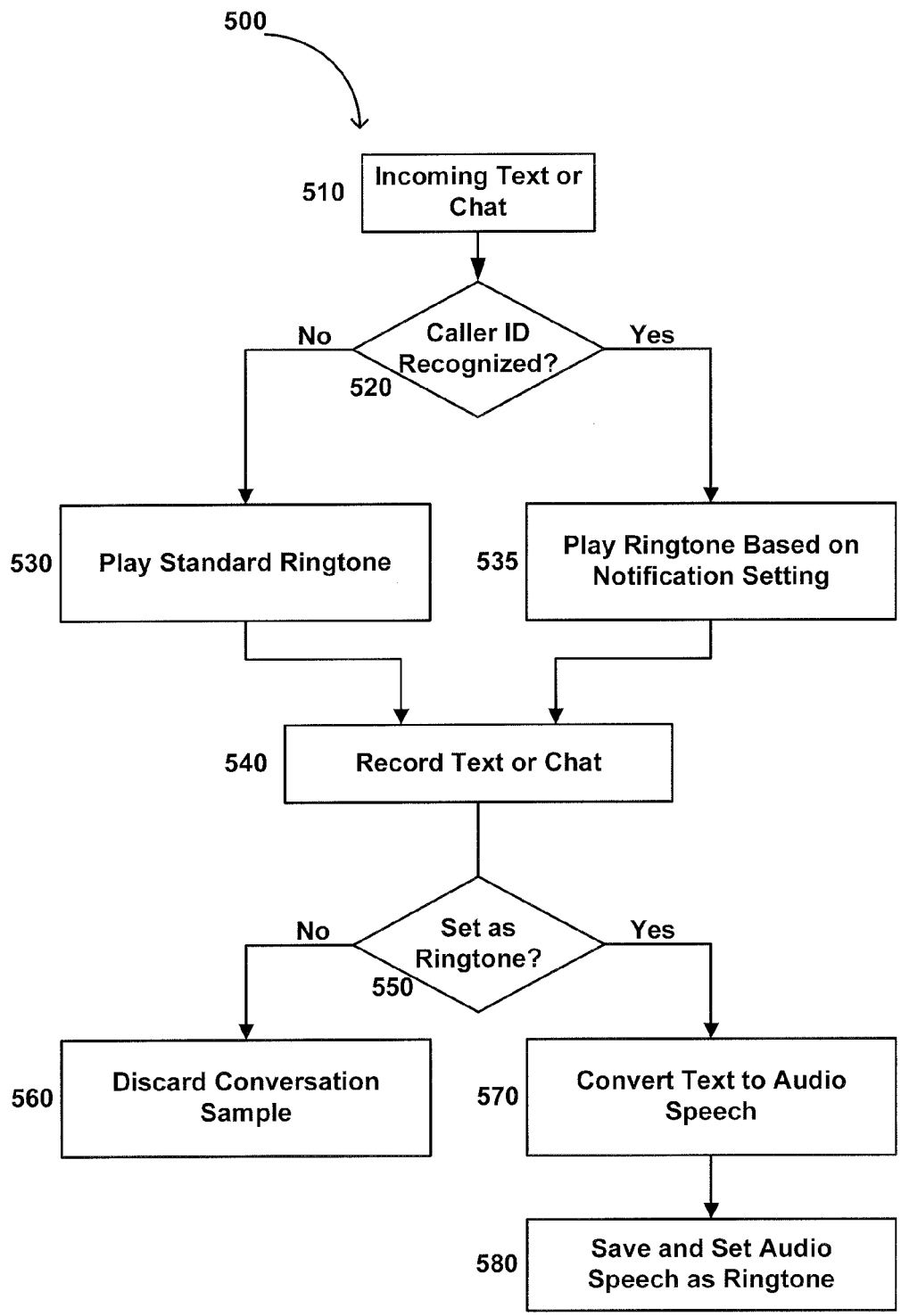
FIG. 5 is a flow diagram illustrating a method of creating and using a text-based ringtone.

With reference to FIG. 5, a flow diagram is shown illustrating a method 500 of creating and using a text-based ringtone, in accordance with an alternative embodiment of the present invention. At step 510, the user receives an incoming text message or text chat request from a caller, including caller ID information. At step 520, it is determined whether the caller ID information is recognized, by reference to a contacts database. If the caller ID is not recognized, then at step 530, a standard ringtone is played for the unrecognized caller. If the caller ID is recognized, then at step 535, a ringtone is played based upon the notification setting associated with the contact. At step 540, the text is recorded. In the case of a text message, the text will already be saved so it is likely that no additional recording is required. However, in the case of a chat, then the text will be captured as a chat log. Furthermore, it may be desirable to select a sample from the captured text. At step 550, the user has the option to set the recorded text as a ringtone to be played when a subsequent call from the same caller is received. If the user decides not to do so, then at step 560, the user has the option to discard the recorded text. If the user decides yes, then at step 570, the conversation sample is converted to audio speech by a text-to-speech method as is known in the art. At step 580, this audio speech is saved as an audio file or in a database, and the notification setting for the contact is set so that the speech will be played when a subsequent call is received from the caller.

Figure 6:
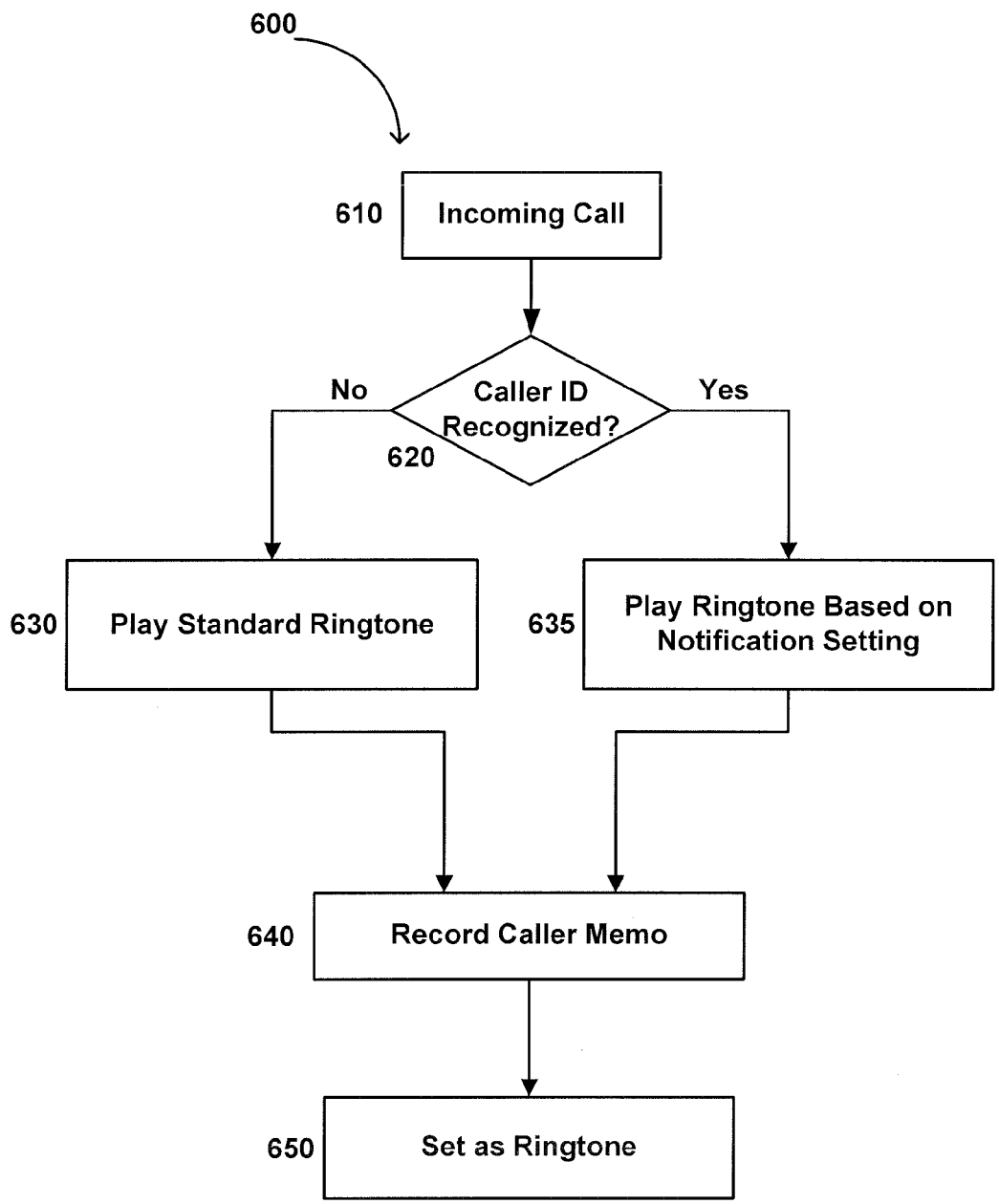
FIG. 6 is a flow diagram illustrating a method of creating and using a caller memo-based ringtone.

With reference to FIG. 6, a flow diagram is shown illustrating a method 600 of creating and using a caller memo-based ringtone, in accordance with an alternative embodiment of the present invention. At step 610, the user receives an incoming call from a caller, including caller ID information. At step 620, it is determined whether the caller ID information is recognized, by reference to a contacts database. If the caller ID is not recognized, then at step 630, a standard ringtone is played for the unrecognized caller. If the caller ID is recognized, then at step 635, a ringtone is played based upon the notification setting associated with the contact. Assuming that the caller is unavailable or otherwise does not take the call, then at step 640, the caller records a memo to be used as a ringtone. At step 650, the recorded memo is saved as an audio file or in a database, and set as a ringtone to be played when a subsequent call from the same caller is received.

Prior art mechanisms exist for establishing voice communications between two computers over the internet. An example of a system that can provide such an ability in a personal computer using standard communication mechanisms is disclosed in the book *Programming Flash communication Server*, written by Brian Lesser, Giacomo Guilizzoni, Robert Reinhardt, Joey Lott, and Justin Watkins (O'Reilly Media, Inc. 2005; ISBN: 0596005040), incorporated herein by reference. This book, and many systems built using its basic methodology, such as the Ribbit platform, use the Flash standard for conducting the audio stream to computer speakers, in particular by means of the Flash NetConnection and Netstream objects which invoke Adobe Flash proprietary facilities running under a browser such as the open source Firefox. Other books that have covered this topic in detail include *Macromedia® Flash™ MX* 2004 *for Rich Internet Applications*, by Phillip Kerman, (New Riders 2003, Print ISBN-10; 0-7357-1366-9) incorporated herein by reference, in which it is noted that two NetStream instances are necessary for simultaneous transmission and receipt of audio or video, as in a telephone. Another book, *Flash 8: Projects for Learning Animation and Interactivity*, by Rich Shupe; Robert Hoekman, Jr., (O'Reilly 2006, Print ISBN-10: 0-596-10223-2, Print ISBN-13: 978-0-59-610223-4), incorporated herein by reference, analogizes the NetConnection as the phone call made to a company switchboard, and the NetStream as the conversation. These and many other examples incorporate code that implements dual Netstream instances, each providing the sound (and optionally video) architecture, to provide for varying degrees of convenience in telephonic communication. Platforms such as Ribbit instantiate such methods with industrial scaling, dialing code conveniences and bridges to the general phone networks to provide VOIP connectivity to traditional handsets. Migration routes such as Maemo and WinMo have brought the applications and interfaces into small handsets. Many of these platforms further are open to allow developers to address them by creating applications using the existing phone communications mechanism.

To provide for simultaneous Recording capability on top of telecommunications within, an "Open Source" (Linux-based) project which addresses the same NetStream and NetConnection standards can be used on the client side. Furthermore, by operating under Linux, the entire client-side set up is rendered in Open Source and can be modified at will by any programmer, using the project documentations which are publicly available and known to those in the art. Methods for saving files, processing and working with sounds are quotidian within such an enabled context. In particular, an Open Source project which addresses the same NetStream and NetConnection standards that can be used conveniently on the client side, particularly under Linux, is Gnash.

With a commercial phone platform such as Ribbit or equivalent commercial or constructed, the Gnash "open source" Gnu Public License project provides a full source code library that replaces the Adobe Flash audio handling implementation in a FireFox plug-in. Thus, the code may be modified to retain in memory a copy of each sound as it is played, along with processing it as desired. Gnash and its source code are incorporated herein by reference, a listing of which is provided in the gnash.txt file included in the computer listing appendix described above.

Figure 7:
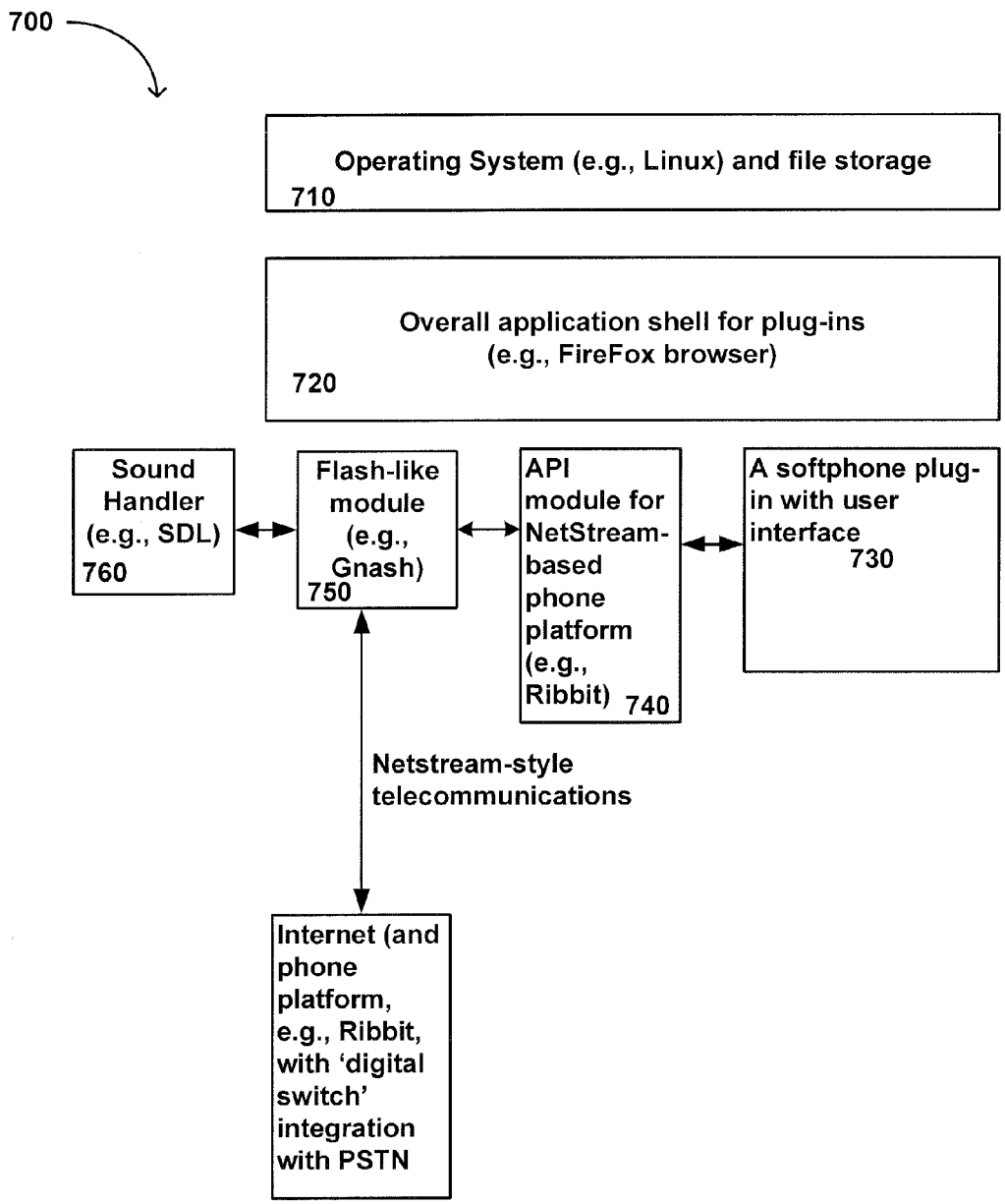
FIG. 7 is a diagram of a Netstream-type communications system, in which the present invention may be implemented.

With reference to FIG. 7, a Netstream-type communications system as presently described is shown, in which the present invention may be implemented. Operating system 710 (e.g. Linux) provides a platform and access to file storage.

Application shell 720, such as a browser (e.g. the open source standard Firefox), provides a shell for plug-ins. Softphone plug-in 730 provides a user interface for a software telephone. API module 740 (for a Netstream-based phone platform such as Ribbit) facilitates interaction with Flash-like module 750 (e.g. Gnash), which handles Netstream-type telecommunications streams communicated over the internet. Sound handler 760 (e.g. SDL) facilitates production of sound.

In accordance with an embodiment of the present invention, we presently disclose a set of modifications to Gnash to provide for conversation-based ringtone functionality. The Gnash code's implementation of the NetConnection and NetStream class relies on a pair of "sound_handlers." One sound_handler is designated GST (GStreamer); the other Sound handler of Gnash is designated by SDL, Simple Directmedia Layer.

Either or both sound_handler platforms are modifiable to afford Gnash a recording capability, depending on the additional capabilities desired in a customized ringtone instance. GStreamer is suited for more elaborate sound processing, and required for video; thus, modification of the simpler SDL version suffices for a straightforward telephonic embodiment of the present invention, which clearly can be extended to the video sound handler, too. Four Public Member Functions lie at the crux of the SDL-based Gnash implementation:

1) virtual int create_sound (void*data, int data_bytes, int sample_count, format_type format, int sample_rate, bool stereo) Called to create a sound.
2) virtual long fill_stream_data (void*data, int data_bytes, int sample_count, int handle_id) Called when a stream gets more data.
3) virtual void play_sound (int sound_handle, int loop_count, int offset, long start_position, std::vector<sound_envelope>*envelopes) Play the indexed sample.
4) virtual void delete_sound (int sound_handle) Called when it is done with a sample.

These functions are implemented, for the SDL case, in the source code, (reproduced in the SDL_source.doc file for convenience, and incorporated by reference as listed above).

The SDL library called by these Gnash facilities performs the actual invocation of the OS and/or hardware sound production audio driver type code to make sound from the speakers. The SDL audio runs independently in a separate thread, filled via a callback mechanism to Gnash. Further detail is publicly available from a variety of sources, known to those in the art, such as the book *Linux Multimedia Hacks* by Kyle Rankin, (O'Reilly Pub 2005, Print ISBN-10: 0-596-10076-0, Print ISBN-13: 978-0-59-610076-6), which will be helpful in tuning the instantiation to a particular specification, and make it clear how to work with sound at this level. Given those teachings, the Gnash sound_play code (a subset of the SDL source code, extracted for convenience in the sound_play.doc file, incorporated by reference as listed above) can be modified; the crux of that mod consists of inserting code at the end, before the close brace and just after the fragment:

```
if (soundsPlaying == 1) {
    SDL_PauseAudio(0);
}
``` which will thus be invoked as each sound fragment, which has come from the NetStream Flash-like call to GNASH, is passed to the SDL to be played. (Note that the SDL_PauseAudio(0); calling line actually starts the sound fragment playing.) This sound fragment can then be output to longer term memory storage by means readily known in the art, assembling the fragments or further processing them in turn to produce a saved copy of some or all of the input sound stream which will serve as the source for the customized ringtone. Alternately, the SDL library itself can be modified to save such a file from the stream of sound sent to it.

Having those conversation sound files saved by means such as that disclosed above, or other means already known in the art, they may further be associated with keys designating the caller, stored and retrieved from a database on that basis by means well known in the art to enable the production of customized ringtones as described.

Figure 8:
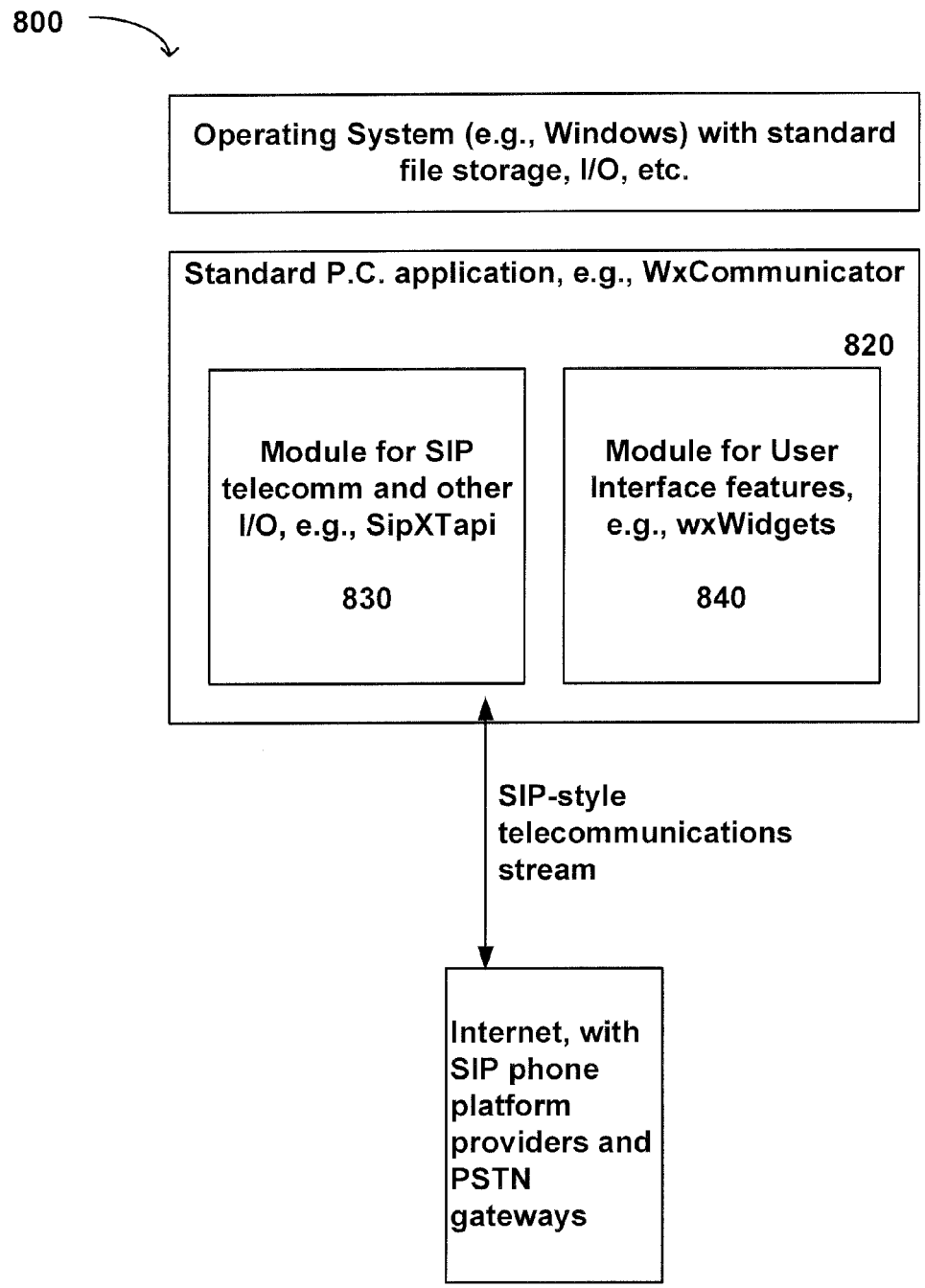
FIG. 8 is a diagram of a SIP-type communications system in which the present invention may be implemented.

Alternatively, any of a number of SIP-type softphones could be modified to provide a basis for practicing the present invention. With reference to FIG. 8, a SIP-type communications system 800 is shown, in which the present invention may be implemented. Operating system 810 (e.g. Windows) provides a platform and access to file storage, I/O, etc. Application 820, such as wxCommunicator, includes module 830 for handling SIP (Session Initiation Protocol) telecommunications and other I/O, and module 840 for user interface features. Application 820 supports a SIP-type telecommunications stream that runs over the internet.

For purposes of implementing the principles of the present invention, wxCommunicator provides an open source project with full source code and documentation that is publicly available and known to those in the art. As it already contains user accessible call record and ringtone functions, one can implement the present invention within its context. In order to facilitate the functions as disclosed herein in accordance with the present invention, wxCommunicator's ringtone function can be modified to retrieve a file selected programmatically instead of by the user, and its recording function changed to record in accordance with an aspect of the invention instead of via a manual start command from the user.

Figure 9:
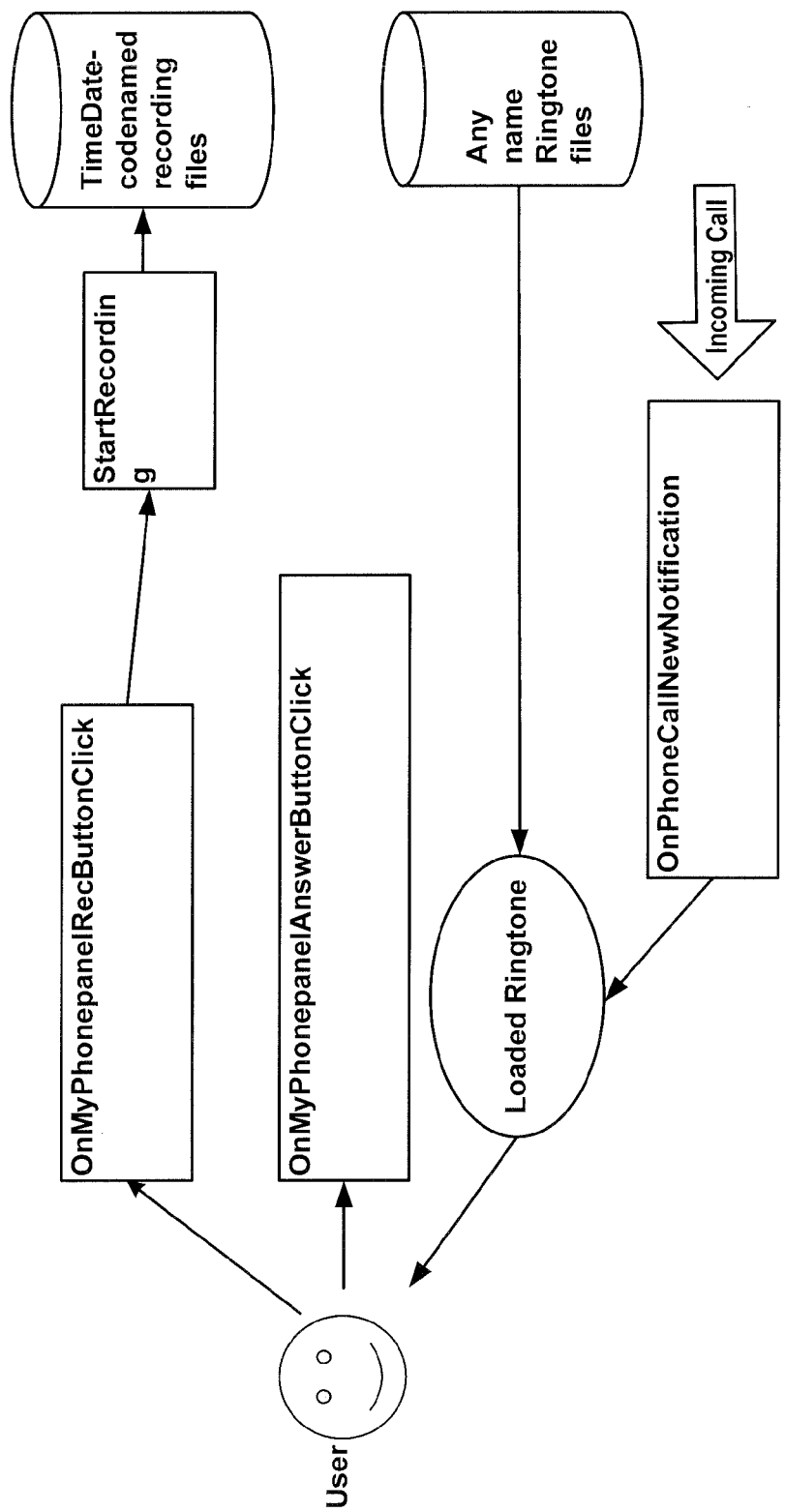
FIG. 9 is a block diagram showing the basic unmodified architecture of wxCommunicator.

Therefore, in accordance with an embodiment of the present invention, we presently disclose a set of modifications to wxCommunicator that implement the conversation-based ringtone mechanism. These modifications are applied to the standard version of wxCommunicator, (herein incorporated by reference, a listing of which is supplied in the file wxCommunicator.txt in the computer listing appendix, as indicated above), which compiles with Visual Studio 2005 and runs on Windows XP. FIG. 9 illustrates in a block diagram the basic unmodified architecture of wxCommunicator (not all connections shown).

To begin with, it is noted that the line of code in sipx-tapiproxy.cpp, in StartRecording:
wxString path=wxString::Format(wxT("%\\recordings"), wxGetApp( ).m_Configurator.GetDataPath( ));

In the unmodified wxCommunicator source code release specifies the name of the folder in which call recordings are saved as "recordings." This is changed to save in the same folder, "sounds," as the ringtones:
wxString path=wxString::Format(wxT("%\\sounds"), wxGetApp( ).m_Configurator.GetDataPath( ));

This creates a version of wxCommunicator in which a portion of a phone conversation can be recorded, saved, and manually selected to be subsequently used as a ringtone.

Next, to add functionality the first part of StartRecording's code is changed, so it reads as shown below:

```
/**************************************************************************
*/
/* start call recording // mod for reminder-ring */
/**************************************************************************
*/
bool SipXTapiProxy::StartRecording(PhoneCall *pPhoneCall, wxString call_username)
const
{
  if (m_SipXInstance && !m_bSipXCallInProgress)
  {
    if (pPhoneCall)
    {
      // mods for simple starter version of reminder ring:
      // first: replace 'recordings' directory name with the ringtones directory name, 'sounds'
      // previously, the next line was:
      // wxString path = wxString::Format(wxT("%s\\recordings"), wxGetApp( ).m_Configurator.GetDataPath( ));
      // now changed to:
      wxString path = wxString::Format(wxT("%s\\sounds"), wxGetApp( ).m_Configurator.GetDataPath( ));
      // previous code, to do user-selected ring; probably want to bring back later for offering alternative
      // wxDateTime timeNow = wxDateTime::Now( );
      // wxString filename = wxString::Format(wxT("%s\\%s.wav"), path, timeNow.Format(wxT("%Y-%m-%d %H-%M-%S")));
      /* Next, just create based file name with reminder ring file name */
      // for this prototype, first just map special chars to produce a unique but acceptable file name for Windows
      // embodied with a simple fix for now just for the two special chars " and ,
      // that show up in SIP bridge caller ids but can't be in file name.
      // more elaborate version later can offer user choice of rr or standard rings, map all special chars algorithmically
      wxString temp_string = call_username;
      temp_string.Replace(wxT("\""), wxT("-quote-"));
      temp_string.Replace(wxT("\""), wxT("-quote-"));
      temp_string.Replace(wxT(","), wxT("-comma-"), 1);
      call_username = temp_string;
      wxString mapped_call_username = call_username;
      wxString filename = wxString::Format(wxT("%s\\%s.wav"), path, call_username);
      SIPX_RESULT sipxResult;
      sipxResult = sipxCallAudioRecordFileStart(pPhoneCall->m_hCall, filename.mb_str(wxConvUTF8));
      if (sipxResult != SIPX_RESULT_SUCCESS)
      {
        LOGBASIC(LOG_ERROR, _("sipxCallAudioRecordFileStart failed, error code %i"), sipxResult);
        return false;
      }
      else
      {
        LOGBASIC(LOG_VERBOSE, _("sipxCallAudioRecordFileStart call successful"));
        pPhoneCall->m_bIsSoundBeingRecorded = true;
        pPhoneCall->OnChanged( ); // notify observers, maybe they are displaying this info somewhere
        return true;
      }
    }
    else
    {
      LOGBASIC(LOG_ERROR, _("Wrong parameters in StartRecording"));
      return false;
    }
  }
  else
  {
    LOGBASIC(LOG_ERROR, _("Aborting call, another async sipxtapi call is in
```

```
-continued progress, or sipxtapi is not initialized."));
  }
  return false;
}
```

Thus, the file name under which a recording is saved is unique to the "caller ID" (often called user name in SIP; the terms are applied interchangeably for purposes of the present disclosure). (It is noted that if a 'bridge' or 'gateway' from PSTN to SIP is used by the caller, instead of a sister SIP phone, the origin PSTN caller-id code may not be available, or, for instance, will be replaced with a designation of the caller's geographic location such as their city, and thus all calls from that gateway, or through that gateway from a particular city, respectively, may ring the same ringtone; but this example suffices to illustrate the technique that can be applied in other contexts as are described elsewhere in this disclosure.)

Then at the end of phonepanel.h, a declaration is added for rr_username to hold the callerID, making the end of the file read:

```
wxBitmapButton* m_BlindTransferButton;
// mod for reminder-ring
    wxString rr_username;
    /// Control identifiers
    enum {
      MYFRAME_PHONEPANEL = 10008
    };
////@end MyPhonePanel member variables
    MyBitmapToggleButton* m_CurActiveLineBtn; ///< pointer to
    active line button
    MyLineButtonArray m_LineButtonArray;   ///< array of line buttons
};
#endif
    // _PHONEPANEL_H_
```

And in SipXTApiProxy.h, in order to pass in the caller id needed to generate a unique reminder ring file name for each 'caller id' (usually related to username in this SIP-related codebase), a parameter is added to the calling sequence of
bool StartRecording(PhoneCall*pPhoneCall) const;
  In its declaration, making it:
bool StartRecording(PhoneCall*pPhoneCall, wxString username_parameter_for_rr) const;
  In phonepanel.cpp, OnMyphonepanelRecbuttonClicked call is changed to startRecordinig to pass in the caller id (i.e., user name), as follows:

```
void MyPhonePanel::OnMyphonepanelRecbuttonClicked(
wxCommandEvent& event )
{
  // set rec button to previous state, as it will be updated to correct
  state by event
  m_RecButton->SetValue(!m_RecButton->GetValue( ));
  PhoneCall* pCall = GetSelectedPhoneCall( );
  if (pCall)
  {
    if(!pCall->m_bIsSoundBeingRecorded)
    {
    // mod for reminder-ring
    // SipXTapiProxy::getInstance( )->StartRecording(pCall);
      SipXTapiProxy::getInstance( )->StartRecording(pCall, rr_username);
    }
    else
```

```
-continued

{
      SipXTapiProxy::getInstance( )->StopRecording(pCall);
    }
  }
}
```

Also in that file, OnPhoneCallNewNotification is modified so it saves the caller id of an incoming call:

```
void MyPhonePanel::OnPhoneCallNewNotification(wxCommandEvent
&event)
{
  PhoneCall *pCall = wxDynamicCast(event.GetEventObject( ),
  PhoneCall);
  if (pCall)
  {
    int pos;
    wxListItem listItem;
    int lineIndex =
    DataModel::getInstance( )->FindLineIndexByHandle(pCall-
>m_hLine);
    wxString statestr =
    SipXTapiProxy::getInstance( )->GetCallStateString(pCall);
    listItem.SetText(wxString::Format(wxT("%i"), lineIndex + 1));
    listItem.SetColumn(0);
    listItem.SetData(pCall->m_hCall);
    pos = m_MainCallList->InsertItem(listItem);
    m_MainCallList->SetItem(pos, 1, statestr);
    wxString username = SipXTapiProxy::getInstance( )-
>GetUsernameFromSipUri(pCall->m_sRemoteParty);
    m_MainCallList->SetItem(pos, 2, username);
    // mod for reminder-ring: pass the username on to id the recorded
    call fragment
    rr_username = username;
    long selectedItemId = GetSelectedCallItemId( );
    m_MainCallList->SetItemState(selectedItemId, 0,
wxLIST_STATE_FOCUSED|wxLIST_STATE_SELECTED);
    m_MainCallList->SetItemState(pos, 6,
wxLIST_STATE_FOCUSED|wxLIST_STATE_SELECTED);
  }
}
```

The result is then a version of the wxCommunicator softphone that will allow the user to record conversation and have it automatically saved under a unique identifier as a ringtone, which can be manually chosen from the wxCommunicator ringtone menu. To complete the basic implementation of a conversation-based ringtone one can make the manual choice automatic. A line is added to the end of OnPhoneCallNewNotification, so it is as follows:

```
void MyPhonePanel::OnPhoneCallNewNotification(wxCommandEvent
&event)
{
  PhoneCall *pCall = wxDynamicCast(event.GetEventObject( ),
  PhoneCall);
  if (pCall)
  {
    int pos;
    wxListItem listItem;
    int lineIndex =
```

```
    DataModel::getInstance( )->FindLineIndexByHandle(pCall-
>m_hLine);
        wxString statestr =
SipXTapiProxy::getInstance( )->GetCallStateString(pCall);
        listItem.SetText(wxString::Format(wxT("%i"), lineIndex + 1));
        listItem.SetColumn(0);
        listItem.SetData(pCall->m_hCall);
        pos = m_MainCallList->InsertItem(listItem);
        m_MainCallList->SetItem(pos, 1, statestr);
        wxString username = SipXTapiProxy::getInstance( )-
>GetUsernameFromSipUri(pCall->m_sRemoteParty);
        m_MainCallList->SetItem(pos, 2, username);
        // mod for reminder-ring: pass the username on to id the recorded
        call fragment
        rr_username = username;
        long selectedItemId = GetSelectedCallItemId( );
        m_MainCallList->SetItemState(selectedItemId, 0,
wxLIST_STATE_FOCUSED|wxLIST_STATE_SELECTED);
        m_MainCallList->SetItemState(pos, 6,
wxLIST_STATE_FOCUSED|wxLIST_STATE_SELECTED);
        // mod for reminder-ring: grab the sound for this caller
        SipXTapiProxy::getInstance( )->ReloadRingtone(username);
    }
}
```

And additional code to perform the 'ReloadRingtone' function is inserted into SipXTapiProxy.h:

```
bool ReloadRingtone(wxString username_parameter_for_rr);
and to SipXTapiProxy.cpp, where the temp_string encoding used previously is repeated:
/******************************************************************
*/
/*      reload ringtone       // mod for reminder-ring            */
/******************************************************************
*/
bool SipXTapiProxy::ReloadRingtone(wxString call_username)
{
        // mods for simple starter version of reminder ring:
            wxString path = wxString::Format(wxT("%s\\sounds"),
wxGetApp( ).m_Configurator.GetDataPath( ));
            wxString temp_string = call_username;
            temp_string.Replace(wxT("\""), wxT("-quote-"));
            temp_string.Replace(wxT("\'"), wxT("-quote-"));
            temp_string.Replace(wxT(","), wxT("-comma-"), 1);
            call_username = temp_string;
        wxString changeto_filename = wxString::Format(wxT("%s\\%s.wav"), path,
call_username);
            wxString current_filename =
::wxGetApp( ).m_Configurator.GetCurrentRingtonePath( );
            wxString filename = changeto_filename;
        //wxString sRingtone = DataModel::getInstance( )-
>m_AudioSettings.getRingtone( );
            //wxString sRingtonePath =
::wxGetApp( ).m_Configurator.GetCurrentRingtonePath( );
            // mod for reminder-ring prototype
            //m_RingtonePlayer.LoadFile(sRingtonePath);
            m_RingtonePlayer.LoadFile(filename);
            return true;
}
```

The result is the further functionality of playing as a ringtone the last sound recorded by the user of all incoming call from that caller id. (It is recognized that further refinement of the presently disclosed system may entail addressing the following: various file sizings, error diagnosing, perfect initializations, proper handling of outgoing calls, multiple lines, merging voice streams, conference calls, etc.) To facilitate automatic recording of the line a further modification to phonepanel.cpp is performed:

```
void MyPhonePanel::OnMyphonepanelAnswerbuttonClick(
wxCommandEvent& event )
{
  PhoneCall* pSelectedCall = GetSelectedPhoneCall( );
  // we pick up if call is in ALERTING state, or dial if not
  SipXTapiProxy::getInstance( )->OnAnswerbuttonClick(pSelectedCall);
  // mod for reminder-ring prototype: start recording every call answered
  if (pSelectedCall)
  {
        wxCommandEvent dummy_event;
            OnMyphonepanelRecbuttonClicked(dummy_event);
/* just pretend the user clicked Record */
  }
}
```

The open source wxCommunicator SIP softphone is modified by making changes to the code for StartRecording, OnMyphonepanelAnswerbuttonClick, OnMyphonepanelRecbuttonClicked, OnPhoneCallNewNotification; adding a global variable rr_username shared between the latter two; and new code to make ReloadRingtone. (These are shown in final modified form in the computer listing appendix in the file modified_wxCommunicator.txt, herein incorporated by reference as described above.) The modified wxCommunicator architecture is illustrated as a block diagram in FIG. 10 (not all connections shown). The aforementioned modifications to wxCommunicator provide a basic conversation-based ringtone capability: incoming calls ring using a recording of the caller's voice from a prior conversation, creating a reminder ring. Additional capability such as that described elsewhere in this disclosure can be built, by means known in the art, on this foundation or alternatives.

Further extending the current invention, wxCommunicator code is used as a foundation for instantiating extensions applying its technology in a similar fashion for reminding a user of an appointment or other calendar-based event, or any other event. To disclose such a mechanism we enlist yet another open source package, known as Rainlendar (the source code of Rainlendar is attached on CDROM #2 and herein incorporated by reference). Rainlendar provides standard pop-up message box reminders and event calendaring functionality in a Windows application. It will be clear to anyone with skill in the art that there are a number of straightforward ways to combine this application with the aforementioned SIPC phone to create a single shared codebase presenting the user with a phone with ReminderRing and a calendar program without ReminderRing.

With both codebases under one roof, a few modifications then suffice to integrate them enough to create a calendaring app with ReminderRing functionality. The Rainlendar architecture is modified by adding additional methods to the "CEntryEvent" object to set and retrieve a parameter which indicates the sound to be used to announce the reminder of that calendar event. In this implementation this is the equivalent of rr_username as employed in the modified wxCommunicator code described in FIG. 10 and implemented in a fashion equivalent to the existing Rainlendar CEntryEvent method GetBriefMessage and its text-setting counterpart approach. For example, these may be called 'GetAudibleReminderFromEvent' and 'setAdibleReminderToEvent'. They are then evoked during calendar event creation by user interface driven options which allow the user to select if he wants a calendar event to be announced with an audible 'reminder' or not.

Figure 10:
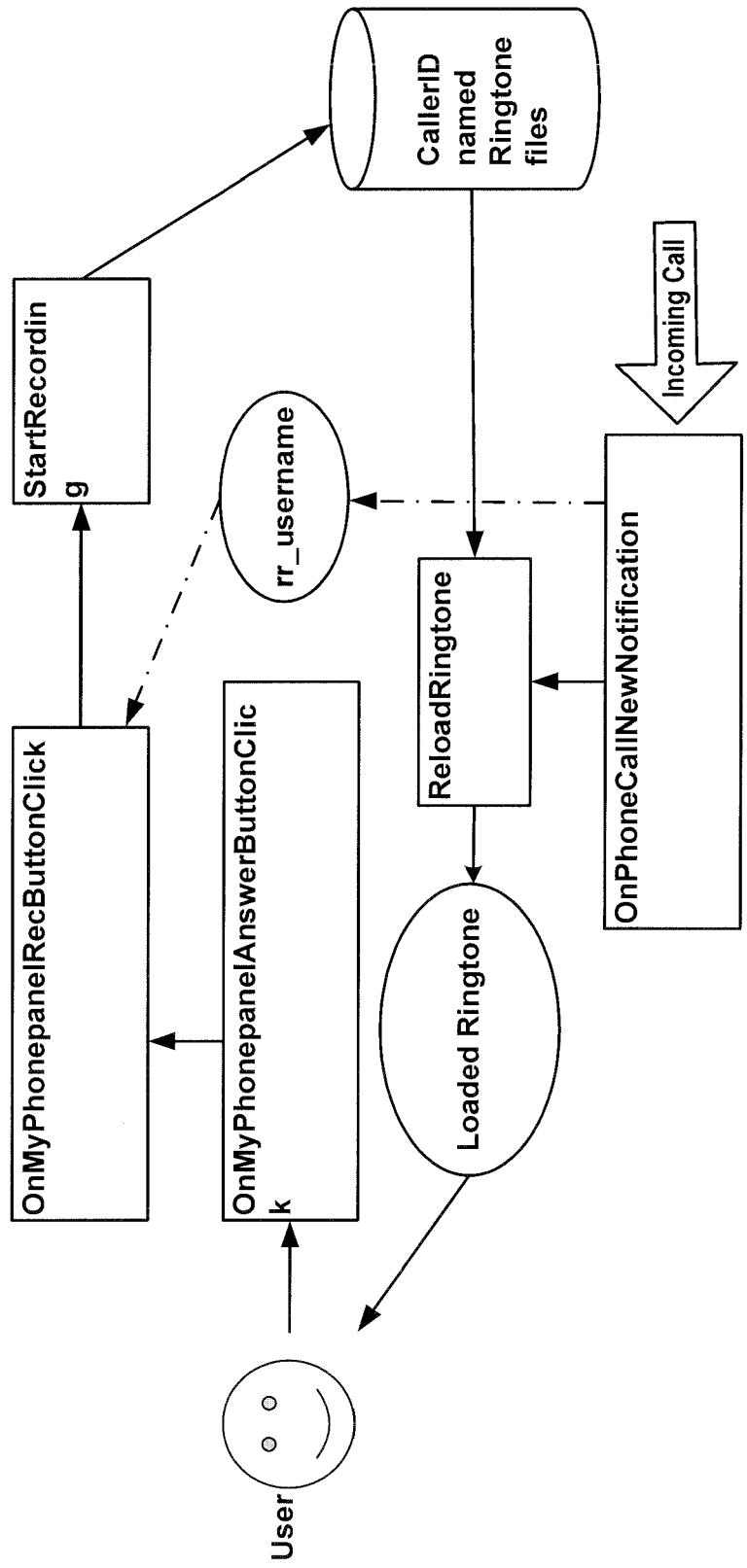
FIG. 10 is a block diagram showing the modified architecture of wxCommunicator in accordance with an embodiment of the present invention.

In this embodiment, illustrating this concept, the reminder sound may have been previously extracted from a phone conversation and stored in memory as previously disclosed (see FIG. 10). Multiple such reminders may also be stored in this fashion, and that a user could indicate which was to be used, or an automated system could, by additional means of voice recognition during a phone conversation or other voice interaction, determine the intention to create both the event and its text and/or audible label.

To trigger the event audible reminder, the Rainlendar code for CMessageWindow's GetTextFromEvent code, shown below, must be modified to extract from its CEntryEvent parameter its new 'event' variable by using the aforementioned GetAudibleReminderFromEvent just as it presently uses GetBriefMessage. A new parameter added to it, like the 'text' one it presently uses to return the result, can return the rr_username audible reminder generator. That reminder is then invoked by the caller, which may be supplemented with a text reminder on screen, using the same facilities as for a reminder ring. User settings may have the audible reminder generated be augmented by synthetic speech of the basic text as prolog, or not, as the user chooses. The existing code for CMessageWindow is show below:

```
void CMessageWindow::GetTextFromEvent(CEntryEvent* event,
CFileTime alarmTime, std::string& text)
{
        CFileTime today;
        today.SetToLocalTime( );
        event->GetBriefMessage(text, 0, true, true, &alarmTime);
        if (alarmTime.IsValid( ) && !event->IsAllDayEvent( ))
        {
          int diff = alarmTime.GetAsSeconds( ) -
          today.GetAsSeconds( );
          diff /= 60;
          char buffer[MAX_LINE_LENGTH];
          if (diff >= 0)
          {
                sprintf(buffer,
CCalendarWindow::c_Language.GetString("General", 21), diff);
// Due in ...
          }
          else
          {
                sprintf(buffer,
CCalendarWindow::c_Language.GetString("General", 25), -diff);
// ...overdue
          }
          text += buffer;
        }
}
```

An implementation of it with the modifications described above is shown below, with the modifications:

```
void CMessageWindow:: GetAudibleReminderFromEvent
(CEntryEvent* event,
CFileTime alarmTime, std::string& text, wxString&
username_parameter_for_rr)
{
        CFileTime today;
        today.SetToLocalTime( );
        event->GetBriefMessage(text, 0, true, true, &alarmTime);
        event->GetBriefMessage(text, 0, true, true,
        &username_parameter_for_rr);
        if (alarmTime.IsValid( ) && !event->IsAllDayEvent( ))
        {
          int diff = alarmTime.GetAsSeconds( ) -
          today.GetAsSeconds( );
          diff /= 60;
          char buffer[MAX_LINE_LENGTH];
          if (diff >= 0)
          {
                sprintf(buffer,
CCalendarWindow::c_Language.GetString("General", 21), diff);
// Due in ...
          }
          else
          {
                sprintf(buffer,
CCalendarWindow::c_Language.GetString("General", 25), -diff);
// ...overdue
          }
          text += buffer;
        }
}
```

As shown in FIG. 11, the above described code modifications enable one to make a calendaring application with a reminder ring, conveyed in one or more ways, such as in an audible single related to the event. The basic combination of the phone and calendar systems described above is shown in FIGS. 11 and 12. FIG. 12 is similar to FIG. 11, with the addition of the calendaring reminders as reactions to timing events, and a user interface ("UI") 171 for the user 170 to indicate what events are to be used for which calendar reminder.

The relationship between the calendar timing events 180 and the UI 171 is at its simplest a manual indication of a chosen ringtone for each calendar reminder. As shown in FIG. 12, the UI code 171 presents option-s or the storage of information in the UI Options/Configurations files 172 as shown. That store also is loaded by the recording code which is resident in the module labeled 174 so that it contains the information related to what recordings are available as reminder rings and how they originated. This information is then available to the Calendar Timing Event 180 handling functionality, including the function. GetAudibleReminderFromEvent 181.

Continuing with FIG. 12, more sophisticated user options are accommodated. The reminder ring for annunciating a calendar event may be taken from the last telephone conversation with an intended attendee at a meeting, from user selection during or immediately after a conversation with anyone, attendee or not, from a voice message left by the requester of the meeting who indicated his request by voice or tones in response to mechanical prompts, by a computer program dealing with email or other textual or programmatic arrangements to request and confirm appointment, or by means of voice recognition of a request for or confirmation of a meeting, among others. There are many other methods previously known in the art that can equivalently be complemented by these techniques. The selection of what shall be used as the reminder ring is manipulated by the UI code 171, shown in the diagram above the user 170. The selected ReminderRing input and the configuration options are stored in the UI Options/Configurations files 172, as shown. That store also is loaded by the recording code present in StartRecording 174, so that it contains the information regarding what recordings are available as reminder rings and how they originated. User 170's selected options can activate the modified StartRecording 174 code. To reflect multiple channels of activation, FIG. 12's communication path between StartRecordinig 174 and UI options/configuration files 172 is now two-way.

Further, FIG. 12 explicitly indicates other processing of the audio files, as has been mentioned above and previously referred to in a number of sections of this document. For example, a playback of a reminder ring could be compressed, either as 'chipmunk-speak', or with frequency adjustments, to make its words play faster. Or in an appointment calendaring function, particularly one with a snooze alarm, a synthetic or prerecorded voice could be appended to the reminder ring to communicate the time remaining.

This invention further provides a personal private caller ID system to unify multiple modes and channels of telecommunication by the user, helping the user keep the modes and channels and their priorities in order as the users are interrupted by time while simultaneously aiding in resolving these multiple modes and channels of communication for the implementation of reminder rings. The multiple modes and channels of communication may include phones, email, instant messaging services ("IM"), social network participations such as game moves or dating requests, voicemail and sound, graphics and video, among others. As those transmissions are increasingly facilitated over the Internet, much of their unification for users can proceed via identification of the IP address of the other party or parties, often in the role of 'caller'. That IP address, and standard caller ID, together with the name or names associated with the caller, their handle(s) on IM, email address(es), among others, is managed in the Private Mapping Database 183 which maintains a party's identity. This mapping, and the overall ReminderRing system, allows the user access to pertinent voice and image recordings which will jog their memory, for instance as reminder rings or forms of mnemonic assistance in various other contexts such as alarms and reference notes in personal lifestreaming files.

This private system of counterparty identity representation, as embodied in the Private ID Mapping Database files 183, may overlap or integrate with more public data storage in which information disclosed by participants or discovered by research can be accessed by the individual user, such as with public mapping databases 176. This will let an individual be able to function much as companies today engaged in telemarketing customer relationship management system do, by utilizing both their own and purchased databases, both for other humans and, turning the table on the companies, representing and managing one's contacts and relationships with companies.

FIG. 13 shows another overall diagram of the current invention, illustrating support for this inversion and other matters. A calendar timing event 180 is added to the phone call reminder ring, which both are further supplemented by many other communications possibilities, only some of which are shown. The potential incoming events are handled by a "ToneMapper" 175, rather than each communication method individually. ToneMapper 175 is connected to a Private ID Mapping Database 183 which maps the callerID equivalents associated with incoming communication events to an rr_username equivalent identification dubbed RR_filename 177 which is part of one or more RR_key_ID 184 designators. The RR_key_ID 184 attempts to identify an individual person regardless of the method of communication they use, or did use, to keep in sync the reminder rings with all communication modes in accordance with the UI options and configuration files 172. ReminderRing tone or other files may be generated as the result of directives from the ToneMapper 175, instead of or in addition to recordings from prior conversations; for example, the reminder ring may be generated by means of speech synthesis from text sent in other modes, such as email, voice samples or parametric derivations thereof stored in the UI options/configurations files 172 to make them in some semblance of that person's voice.

Additionally, the user 170's ID Mapping Database 183 may be partially or fully loaded from, or shared out to, other ID Mapping Databases 176, whether public, private or commercially available. This invention is amenable to supporting an ecosystem of sources of such information, including commercial vendors, nonprofit groups, social networking services, and other organizations, who gather and disseminate such data to augment the private database a user will accumulate himself. For example, a business might furnish an ID Mapping Database to its employees, just as many now hand out a printed list of personnel and their various contact info. These outside ID Mapping Databases 176 are shown at the bottom of the diagram, with a dotted line designating that they may be accessed via many means, such as Internet, static media like cartridges or flash drives or CD-ROMs, or preloaded in a handheld phone for release upon payment. These may only cover one, or a few, possible communications modes; some can be seen as similar to the mailing lists that business now buy to reach out in junk mail, email, and telemarketing, except that they are being utilized by the user 170 instead, to restrict or better manage the communications coming at and from her.

To enable the user 170 to control what, if any, outside ID Mapping Databases 176 he may wish to utilize, and deal with the parameters of how to do that, the User Interface options and Configuration 171 data is shown storing and providing access to such parameters.

Adjunct to accommodating multiple reminder rings for each caller or other communicating person, in FIG. 13, for clarity of teaching this invention the "rr_username", parameter is now relabeled "RR_filename" 177, though its function and use remain similar to the more limited embodiments previously discussed: to designate the data needed to produce the reminder ring for it. In general, this would be a sound file, although it could take other forms, for instance with or as a visual indicator such as text or video, the possibility and means of which have been previously discussed in this disclosure.

The OnMyPhonepanelRecButtonClick 178 and OnMyPhonepanelAnswerButtonClick 179 functions are not limited to phone conversations. Likewise, the New Event Notification 180 handles all types of communication events. All the communication means indicated so far, and many more, are handled through functionality equivalent to that disclosed for phone and calendar, and often shared with it in a number of the modules shown. Non-audible indications may be incorporated, as they often are already in systems featuring blinking icons for calls waiting, or flashing menu bars for email arrivals; nothing in this invention precludes its integration with such established means, or others that may arise, even so far as direct neural interfaces.

It will also be apparent to one skilled in the art that simple extensions into further areas will furnish additional beneficial features by being incorporated within a ReminderRing overall context, such as private callers, or semi- or fully automated choice of which mechanism to communicate with a person using, or security features to protect against spoofing.

Looking now at FIG. 14, an example individual database record structure for the Private ID Mapping Database 183 is shown. The utilized database can be any database, such as the relational database MySQL, or in custom code written for data storage purposes and/or for a specialized platform or enhanced performance.

RR_key_ID 184, which has been discussed earlier is, in essence, the primary internal identifier for a 'person', which in some implementations, as mentioned, could also be a set of people or some other constructed abstraction. A RR_key_ID 184 is assigned to each new person through the user interface 171 and/or, optionally, automatically through ToneMapper 175. For example, some default settings may require the user 170 to designate each person individually and request reminder rings for each; the opposite default would be to utilize a reminder ring automatically for all calls; many possibilities clearly lie between these two extremes. Review and potential deletion of RR_key_IDs 184 can be accomplished through the UI and ID Databases and sharing controller 208.

Next, the Private ID Mapping Database 183 includes standard name and address fields, to accommodate a full appointment system if one is embedded with this embodiment, such as Rainlendar, or any other personal information management and display system that is supplemented with the ReminderRing system. Other fields commonly found in such calendar and contact management systems can be accommodated in this fashion as well. FIG. 14 gives examples of alternate snail mail addresses, notes, and business card images, among other items. Additional data about a person or company, such as that often kept by sales organizations, which could facilitate automated or rules-driven ReminderRing options, may be added to this "other" category.

Further, the RR_filenames 177 that govern reminder rings are shown next, at a "person" or RR_key_ID level 184. A simpler implementation could rely solely on a single RR_key_ID 184.

For each new phone call or equivalent, where an RR_filename 177 already exists, ToneMapper 175 will relay that RR_filename 177 and rename it something else which is used as the reminder ring for that call; but ToneMapper 175 will also create an additional RR_filename 177 which will generally be used to record a part of the current call and then become the reminder ring for a subsequent call or other events. Both the new RR_filename 177 and the old RR_filename 177 are kept in the data field. If the current call was incomplete, or too short, or otherwise failed one of the criteria for creating the new RR_filename 177, then that new RR_filename, along with its related files and data, will be deleted 182 by ToneMapper 175 at the next call event. At that time, as shown in FIG. 15, ToneMapper 175 seeks an alternative 195, which is generally the old RR_filename 177 for the reminder ring.

All RR_filename 177 fields generally include a date and time, in order to facilitate advanced rules-based options, for instance randomizing or cycling through or choosing an alternate reminder ring based on the time of day or other information. Other rules may depend upon sensory data, such as amount of ambient light, or geographic location, possibly obtained via geospatial sensors or mapping. The rules are generally set to specified defaults which may be altered by the user 170, using the UI 171.

Private ID Mapping Database 183 further contains data for various types of communications and other possible ReminderRing trigger events: the first such label and its set of fields, labeled Phone, consist of phone numbers and caller ids that are identified with this person record. Note that one person can have many phones, and one phone can be shared by many people; this is the case with all the communications origination indicators stored in this database. Alongside each phone number can be a whole additional set of RR_filenames 177, as multiple alternates for all cases with that number. The next section is Calendar which includes date-times instead of telecommunications origination indicators. Additional information may be present, including, for example, data to support a full personal information management system.

After the Calendar section in Private ID Mapping Database 183 is field "Email". Besides the RR_filenames 177 as above, this set of "Email" fields introduces two additional concepts. One is flags and other data that indicates and informs possible construction of RR_filenames 177. The flags are shown for this first text-based email communications because text-to-speech conversion may be applicable; however, construction from sound may also be configured. Generally, this construction, be it text-to-speech or from sound, proceeds as usual to make a reminder ring of the previous 'call'. For example, the subject line of an email may be specified to be speech-synthesized to make a reminder ring for the arrival of the next email, or for all subsequent rings from that person. Construction could result in a reminder ring that repeats some part of the person's message as a reminder ring, for example, the subject line twice to convey urgency.

Further, flags may indicate pre-annunciation, described in more detail later in this disclosure, in which case a ring is 'pushed' through to a phone, and ring with a short speech sound or other indicator sent from the caller.

The second concept introduced in the "Email" section is for additional data fields to guard against spoofing (the sending of messages with false addresses of origin). While spoofing can be a problem for any type of transmission, and fields can be included for it in any communications mode, it is particularly prevalent and easy to spoof email.

The next category for Private ID Mapping Database 183 is "Text", as shown in FIG. 14. Text is an example for text-based systems such as instant messaging, short message service texting and chat, in simple text or audio or through social networking groups or even virtual worlds, such as but not limited to Sony's Playstation "Home" or "Blizzard's World of Warcraft". Here items such as alias and avatar names, in combination with IP addresses and more elaborate fores of validation based on ergonomic factors such as voiceprints, can be combined. The simplest would use IP addresses, which is the specific example shown further in this disclosure. Not only other modes of communication, but combinations thereof can be covered; for example, using speech recognition to parse telephone discussions of appointments, then adding sounds from them directly to the calendaring function as reminders.

Additional field sets are given as examples, which may lie inside or outside an RR_key_ID 184 record. Disambiguation guidance is such an example. Disambiguation guidance—data, defaults and options selected by the user to resolve cases of multiple persons at a single origination address, for instance, sharing a phone. For example, see the examples that follow.

Another additional Private ID Mapping Database 183 section may include "Sharing." The present invention establishes a platform which will support an ecosystem of add-ons including many types of shared reminder rings and their underlying data for lists of origination addresses, and for the user to allow limited or unlimited sharing of his own data with friends, family, social networking groups, and commercial and nonprofit entities. For example, businesses may have ReminderRing databases that include employees' various phone numbers and email addresses, similar to, for example, those some employers hand out to new employees now. Other datasets may be sold on CD-Rom or cartridges or for download, or any other data transmission system. Some may have security mechanisms. The means for this sharing to occur will require support within this database, in these fields. Other possibilities of sharing include importing existing contacts databases.

Another additional Private ID Mapping Database 183 section may be "Hurdles" or other necessary requirements. Users may set thresholds and methods to govern various methods used by the present invention. For example, they might specify a minimum volume, or length of call, needed to produce from it a subsequent reminder ring.

Though throughout this description RR_key_ID 184 is indicated to correspond to a 'person', that designation is for ease of teaching; clearly the actual 'person' could be assigned to be more than one (a couple, or family, or classroom, or other group) or a corporation, or government agency, or a nonhuman entity such as an automated bank or brokerage or alarm system, or even a working or companion animal given limited telecommunication means for its owners convenience in caretaking, for example.

Furthermore, this relatively flat data storage paradigm could be augmented by means known in the art to furnish contact filtering, priorities, stranger contact management, nested person records (for instance, a company with several people in it), or relationships, among others, as part of a more elaborate instantiation of this invention, or in combination with separate means that would be interfaced with.

Shown in FIG. 15 is ToneMapper 175. ToneMapper 175 in the current embodiment, works with phone calls, calendar appointments times, text messages, email, and many other communications media. On the arrival of one of the communications media e.g., when the new event occurs 190, the identification for instance, the caller ID for a phone call, or the IP address for an internet-based transmission such as a peer-to-peer message or other IM-style communication, or an alias or other identifier used in a chat program, or the account used for text or other messages in a subscription social networking service, such as Facebook or Twitter, or a URL from a blog, news or RSS feed, is ascertained if possible. Then the Private ID Mapping Database 183 and possibly its public and other adjuncts in other storage 176, including possibly the web, are queried 191 to determine if this indicator of the originator of this telecomm message is known, that is, if there is an RR_key_ID 184 for it. If there is not a RR_key_ID 184 for the communication, including if there was no conveyed indicator, for example a phone call with no caller ID, ToneMapper 175 passes on no RR_filename 177, it is a unknown person 192; with no associated person, no special annunciation is indicated, however, the user 170 may add the unknown person to their Private ID Mapping Database 183.

If a RR_key_ID 184 is determined, that RR_key_ID 184 should be mapped to the appropriate RR_filename 177. If there is more than one RR_key_ID 184, for instance for a caller ID or IP address believed to be shared by more than one person, disambiguation 196 of the multiple RR_filenames 177 proceeds by whatever process was made available to and selected by the user; if there are many possibilities for the disambiguation 196 process, the UI options/configuration files 172 will be the primary data source for that process, though some reference to the Private ID Mapping Database 183 may also be involved, and through it even some reference to Public, commercial or other ID Mapping Databases 176 may be obtained.

For illustration so far take for example, a young woman user 170 may have designated that any calls coming from a particular home phone number be annunciated using a snippet of conversation from the last communication with her teenage boyfriend who lives at that home, even if their last conversation had been via an internet-based voice chat utility. A user 170 may have access to rules that specified replacement of a RR_key_ID 184, instead of disambiguation, perhaps temporarily; for instance, to keep the peace during every weekday lunch hour which the young woman often shares with a friendly rival for that boyfriend's attentions, our user might choose settings so that, during that time of day only, her boyfriend's voice snippet from their last conversation would be overridden by his sister's on contacts from all media.

Options also exist where multiple reminder rings may designated for a single RR_key_ID 184, i.e., more than one for a person, although person can mean non-human too, as noted elsewhere. Indeed, there could be separate ReminderRings for each medium, designated by different rules in the UI 171, so that our young friend can hear a snippet from her boyfriend's voice in her last conversation when he calls on the phone, but a different one when lie texts her. In this eventuality, each time it is invoked, ToneMapper 175 will proceed to examine and then resolve one RR_filename 177 from among the possibilities 194, again referencing their description as stored in the UI options/configuration files 172 and optionally supported by other data in the Private ID Mapping Database files 183, arriving at a single RR_filename 177.

This RR_filename 177, whether resolved from out of many or a single RR_filename 177, is then checked to make sure it still exists 193, and has not been deleted or failed to be constructed. If it exists, it is passed on from ToneMapper 178 as shown in the lower box labeled "Exit indicating that RR_filename".

Another course of execution may occur in which we have an RR_key_ID 184 but no RR_filename 177. If so specified, a RR_filename 177 is created 201 and ToneMapper 175 exits indicated the newly created RR_filename 177. This could represent situations such as where a prior text message is to be speech synthesized, such as where no voice recordings exist, but where a flexible speech synthesizer can create a useful personalization. A reason to create the reminder ring instantaneously instead of at a previous time would be memory constraints on the storage of speech compared to text. Another possibility worth noting in this context is the case in which a user wants to have an incoming caller be able to speak and/or transmit from pre-recorded voicings a sound to be used as the ring. This push-ring, or pre-annunciation mode, is particularly valuable when enabled among a platform of phones installed using the present invention. For this, the actual connection of the phone, in most platform architectures would occur in a preliminary module, where a recording would prompt for a short sound bit, for example a two second segment, then 'answering' would result in letting the connection proceed to the user. Users with many calls could benefit from prioritizing through this means.

In either of these or other cases, ToneMapper 175 calls upon functionality which exist outside ToneMapper 175 itself. In particular, such functionality is shown in FIG. 13 as "Create a Tone File" 185. Using the data and new RR_filename 177 sent it by ToneMapper 175 and the UI options 171 chosen by the user 170, "Create a Tone File" 185 creates the reminder ring sound needed in such cases and stores it in the RR_filename database 207.

Note that ToneMapper 175 originates all RR_filename 177 identifiers. In a simple phone-only embodiment, RR_key_ID 184 could be simply assigned as a derivative of the caller ID, as was disclosed at length previously in descriptions of more basic embodiments. But in a more elaborate embodiment with demands such as the potential for multiple persons sharing a single caller ID, and having other means of communication beyond audio-only phones, and having the capacity for maintaining a reminder ring used from a prior call despite the occurrence of a new call or calls in the meantime (that is, not overwriting the prior reminder ring, for example in the case of a very short connection, or in the case of an often-called situation where the user doesn't want the ReminderRing to change constantly, but does want it to change occassionally, say, monthly, or upon some call-length or content threshold), it's better to build out a more flexible system architecture. As shown in FIG. 13, this is accomplished by mainly limiting a 'circuit' of RR_filename 177 assignment and handling to a small core of the functional components of the system, with ToneMapper 175 playing a central role.

When a call or an equivalent communications event occurs, ToneMapper 175 assigns an RR_filename 177, verifying it is not duplicating any other RR_filename 177. ToneMapper 175 then enters that RR_filename 177 into the Private ID Mapping Database 183, optionally creates the reminder ring sound (see FIG. 15), and then sends the RR_filename 177 to New Event Notification 180. In each such occurrence ToneMapper 175 is sending up to two RR_filenames 177 to New Event Notification 180 wherein one is used to designate the reminder ring to be used for the current communication even; the other the reminder ring to be formed from the contents of this communication event, and potentially used to announce some subsequent events.

Assuming two RR_filenames 177 are specified on this communications event, as described above, and now tracking both of them in our continuing commentary, the New Event Notification 180 component then loads 203 the sound related to the first RR_filename 177 and the communication device processes that audio 204, playing it. The New Event Notification 180 component also passes the new RR_filename 177 on to OnMyPhonePanelRecButtonClick 178 or its equivalent, which hands it off to StartRecording 205 and its adjunct process recording component 206 for possible acquisition of another sound to be stored under this new RR_filename 177. Thus, a new RR_filenamne 177 is assigned and filled with content, ready to be used in another round.

Beyond that primary course of execution, RR_filenames 177 are also passed for informational, cataloging, and housekeeping functions. When one is successfully filled with content the UI options/configuration file 172 is updated to so indicate, so the user 170 can view and manage by hand if desired, or diagnostics can be run, or sharing programs can utilize that information. Also, when Public databases 176 are used to import sounds, the ID databases and sharing controller 208 updates both the UI options/configuration files 172 and the Private ID Database files 183, along the lines shown in FIG. 13. When a new RR_filename 177 is not filled, such as when a call is too short for a threshold set by the user 170, or otherwise fails to satisfy the set hurdles, ToneMapper 175 detects this before exiting and will use the former or other alternate RR_filename 177 previously stored, if there is one. The same operation applies if a previously shared RR_filename 177 from a Public 176, Private 183, or other database has been removed. In all these cases, the RR_filename 177 is then deleted by ToneMapper 175, with appropriate housekeeping including its storage being recycled as appropriate.

Besides the event handling role of ToneMapper 175, it may also respond to changes in the Private ID Mapping Database 183 and Public, Commercial, other ID Mapping Database 176, wherein said Database 183 and Database 176 are connected via ID Databases and sharing controller 208, as shown in FIG. 13. In some platforms and implementations, particularly multi-core or chip-based ones, interrupt-driven synchronous capacity may make this a particularly desirable mode of operation.

ToneMapper 175 may also be accessed by outgoing phone calls or other communications; these, not shown specifically in the accompanying Figs., because they are a simpler case and are treated similar to an incoming call, by internally generating a call event for ToneMapper 175 to process, except that no RR_filename 177 needs to be provided. Alternatively, outgoing calls also can be provided with an RR_filename 177, which is used to make the 'ringing' indicator sound to the user 170 while the target's phone is ringing. This reminds the user 170 while it rings of the last conversation and whom he is calling. Furthermore, if it is known that the target also has a device implementing this invention, the phones can be synchronized through the pre-annunciation system previously mentioned, or by Public and other ID Mapping Databases 176, so that the user 170 can hear the same sound his target person is hearing as a 'ringer'. This can serve to remind them both of a prior conversation. It will be clear to one of skill in the art that this design requires no further inventive insight to be extended to accommodate that.

In general, flexibility exists in this design for performance optimization by several methods, including using an RR_filename 177 with a large enough capacity to store a sound itself, and to eliminate or reduce the urgency of some of the mentioned steps; the disclosure of this preferred embodiment is to facilitate teaching of the general invention, not to be prejudicial with respect to any particular implementation. Likewise, often throughout this disclosure, for the sake of clarity ReminderRings will be referred to as sounds, though there are other possibilities, as has been mentioned previously. Further, a "call" may be stated but may be easily substituted by another communication event, such as a calendar timing event, or an email, among others.

For an example of the function of the current invention, the following example is provided. First, a user 170 can access the user interface module 171 to import his Microsoft Outlook application's contacts and set a simple constant reminder ring. The Microsoft Outlook application's contacts are then stored in the Private Mapping ID Database 183. The user 170 then calls a friend to discuss his new ReminderRing system while selecting the OnMyPhonepanelRecButtonClick 178 which activates start recording 205. As previously disclosed, when the user 170 makes the call his friend, two RR_filenames 177 are created. The first RR_filename 177 is checked against the ID Databases and sharing controller 208, which connects databases 183 or 176, for a corresponding RR_key_ID 184 which in turn accesses ToneMapper 175. Because (let us assume) the user has just imported his friend's contact information, there is no currently associated RR_filename 177 and, as such, the ring he hears when calling his friend is generic. When the user 170 terminates the conversation with his friend, process recording 206 is called which processes all or a segment of the audio sample of the conversation. This sample is then stored in memory and the associated RR_filename 177 is stored in RR_filename 177 database/files 207.

Continuing with this example, suppose few minutes later, he hears is the ReminderRing voice of a friend, taken from the last phone call with her, announcing the arrival of an email from her. This occurs because the incoming event of an email message entered ToneMapper 175 which, as shown in FIG. 15, resolved the appropriate reminder ring that was set using the UI 171 which set the appropriate UI options and configuration files 172. Because the user set a general reminder ring, ToneMapper 175 resolved to play the previously stored RR_filename 177 associated with the friend's RR_key_ID 184.

The presently described embodiments of the invention may be implemented in software, hardware, or a combination of both. Furthermore, data storage contemplated in any or all of the presently described embodiments of the invention may reside on or otherwise utilize networked servers, storage and the like.

Information as herein shown and described in detail is fully capable of attaining the above-described object of the invention, the presently preferred embodiments of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more." All structural, electrical, and functional equivalents to the elements of the above-described preferred embodiment and additional embodiments that are known to those of ordinary skill in the art are expressly incorporated herein by reference and are intended to be encompassed by the present claims.

Moreover, it is not necessary for a device or method to address each and every problem sought to be solved by the present invention for it to be encompassed by the present claims. Furthermore, no element, component or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed:

1. A method for generating customized event notifications, the method including the following steps:
    Processing a customized conversation event and related data between a caller and a user wherein said conversation event is created from a recorded conversation sample between said caller and said user;
    Associating the customized conversation event with a first caller identification;
    Storing the processed conversation event, the related data and the first caller identification;
    Receiving a communication event;
    Associating the communication event with second caller identification;
    Comparing the first caller identification and the second caller identification; and
    Using all or a portion of the processed conversation event between the caller and the user to notify the user of the communication event, if the first caller identification and the second caller identification are related.

2. The method of claim 1 wherein the customized conversation event takes place in at least one of the following media: telephone, email, instant messaging, short message service text or chat, a social networking group, or a virtual world environment.

3. The method of claim 1 wherein said communication event is selected from the group of:
    a telephonic conversation, a facsimile, a calendar event, an email, an instant message, a short message service text or chat, a social networking group, or a virtual world environment.

4. The method of claim 1 wherein the first caller identification or the second caller identification is an internet protocol address.

5. The method of claim 1 wherein using the processed conversation event between the caller and the user to notify the user of the communication event comprises converting a textual communication into an audible communication.

6. The method of claim 1 wherein using the processed conversation event between the caller and the user to notify the user of the communication event comprises a customized ring tone.

7. The method of claim 1 wherein the storing of the first caller identification, and the related data, is in a relational database system.

8. The method of claim 1 wherein the caller identification relates the caller to a customized conversation event.

9. The method of claim 1 further comprising:
    presenting the user with an interface for configuring and controlling the customized notification of the communication event.

10. A method of generating a customized event notification, said method including the following steps:
    receiving a customized conversation event between a caller and a user, wherein said conversation event is created from a recorded conversation sample between said caller and said user;
    associating the customized conversation event with a first identification;
    storing the customized conversation event and the first identification in memory;
    receiving a communication event;
    associating the communication event with a second identification;
    searching the memory for a relationship between the first identification and the second identification, wherein if a relationship exists, further:
    retrieving all or a subset of the customized conversation event;
    reconveying to a user all or subset of the customized conversation event.

11. The method of claim 10 wherein the customized conversation event takes place in at least one of the following media: telephone; email, instant messaging, short message service text or chat, a social networking group, or a virtual world environment.

12. The method of claim 10 wherein the reconveying converts a text communication into an audible communication.

13. The method of claim 10 wherein the reconveying is as a ring tone.

14. The method of claim 10 wherein the first identification associates the caller to a customized communication event.

15. The method of claim 10 further comprising:
    presenting the user with an interface for configuring and controlling the customized event notification.

16. The method of claim 10 wherein the reconveying to the user the customized conversation event comprises converting an audible communication into a textual communication.

17. A system to generate a customized event notification comprising:
    a processing device for customizing a conversation event associated with a first caller identification;
    a storage device associated with the processing device for storing the customized conversation event; and
    a transmitting device configured to transmit all or a subset of the customized conversation event from a caller to a user, wherein the processing device is further adapted to relate said conversation event and a communication event associated with a second caller identification, wherein the conversation event is stored in the storage device and the communication event causes the transmitting device to transmit said customized conversation event to notify the user of the communication event after relating the first caller identification with the second caller identification; and
    wherein said conversation event is created from a recorded conversation sample between said caller and said user.

18. The system of claim 17 wherein the storage device implements a relational database management system on a general purpose computer.

19. The system of claim 17 wherein the transmitting device is a speaker.

* * * * *